(12) United States Patent
Kishimoto et al.

(10) Patent No.: US 9,644,801 B2
(45) Date of Patent: May 9, 2017

(54) LIGHT-EMITTING ELEMENT, LIGHT-EMITTING DEVICE, AND METHOD FOR PRODUCT LIGHT-EMITTING ELEMENT

(75) Inventors: Katsuhiko Kishimoto, Osaka (JP); Rina Sato, Osaka (JP); Hidenori Kawanishi, Osaka (JP)

(73) Assignee: SHARP KABUSHIKI KAISHA, Osaka-shi (JP)

( * ) Notice: Subject to any disclaimer, the term of this patent is extended or adjusted under 35 U.S.C. 154(b) by 152 days.

(21) Appl. No.: 14/235,710

(22) PCT Filed: Jul. 4, 2012

(86) PCT No.: PCT/JP2012/067135
§ 371 (c)(1),
(2), (4) Date: Jan. 29, 2014

(87) PCT Pub. No.: WO2013/018494
PCT Pub. Date: Feb. 7, 2013

(65) Prior Publication Data
US 2014/0168942 A1 Jun. 19, 2014

(30) Foreign Application Priority Data
Jul. 29, 2011 (JP) .................................. 2011-167739

(51) Int. Cl.
*F21V 9/16* (2006.01)
*F21K 99/00* (2016.01)
(Continued)

(52) U.S. Cl.
CPC .................. *F21K 9/56* (2013.01); *F21K 9/64* (2016.08); *F21S 48/1145* (2013.01);
(Continued)

(58) Field of Classification Search
CPC .. F21Y 2101/025; F21Y 2115/30; F21K 9/56; F21K 9/64
(Continued)

(56) References Cited

U.S. PATENT DOCUMENTS 5,535,230 A      7/1996  Abe
2005/0213958 A1  9/2005  Uemura
(Continued)

FOREIGN PATENT DOCUMENTS

JP      7-282609      10/1995
JP      2005-208333   8/2005
(Continued)

OTHER PUBLICATIONS

International Search Report and Written Opinion mailed Oct. 16, 2012, directed to International Application No. PCT/JP2012/067135; 7 pages.

*Primary Examiner* — Sean Gramling
(74) *Attorney, Agent, or Firm* — Morrison & Foerster LLP

(57) ABSTRACT

A light-emitting section (2) and a transparent member (1) which is arranged on a side of a surface (SUF2) of the light-emitting section (2) and exhibits transparency with respect to laser light (L) are provided, and the transparent member (1) includes a plurality of scattering microregions (MP) which isotropically scatter the laser light (L) passing therethrough and increase a light-emission spot size of the laser light (L).

16 Claims, 15 Drawing Sheets

(51) Int. Cl.
*F21S 8/10* (2006.01)
*G02B 5/02* (2006.01)
*G02B 5/04* (2006.01)
*F21K 9/64* (2016.01)
*F21K 9/90* (2016.01)
*F21Y 101/00* (2016.01)
*F21Y 115/30* (2016.01)

(52) U.S. Cl.
CPC .............. *F21S 48/214* (2013.01); *F21V 9/16* (2013.01); *G02B 5/0242* (2013.01); *G02B 5/0278* (2013.01); *G02B 5/045* (2013.01); *F21K 9/90* (2013.01); *F21Y 2101/00* (2013.01); *F21Y 2115/30* (2016.08); *Y10T 29/49002* (2015.01)

(58) Field of Classification Search
USPC .......................................................... 362/84
See application file for complete search history.

(56) References Cited

U.S. PATENT DOCUMENTS

2007/0086176 A1* 4/2007 Kanade ................. G03B 15/02
362/16
2011/0157865 A1* 6/2011 Takahashi ................. F21K 9/56
362/84

FOREIGN PATENT DOCUMENTS

JP 2008-28245 2/2008
JP 2010-256457 11/2010

* cited by examiner

FIG. 8
(a)
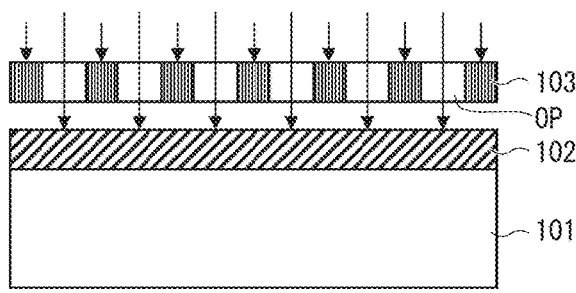
(b)
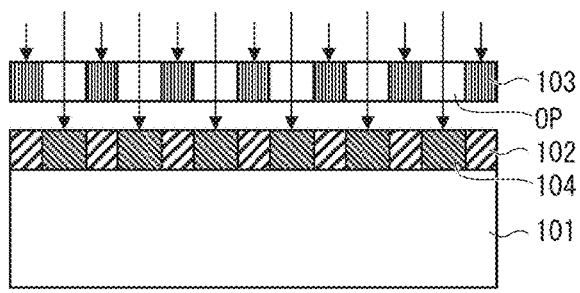
(c)
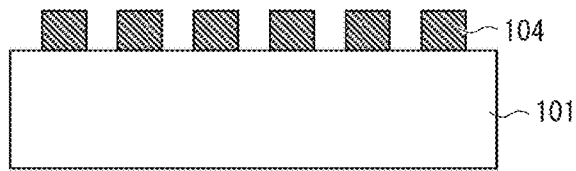
(d)

FIG. 15

|  | LED DOWNLIGHT 300 | LASER DOWNLIGHT 200 |
|---|---|---|
| OUTER SHAPE DIMENSION | DIAMETER: 117 mm ×91 mm | DIAMETER: 60 mm ×20 mm |
| EMBEDDING HOLE DIMENSION | DIAMETER: 100 mm | 50mm |
| EMBEDDING TOOL HEIGHT | 85mm | 15mm |
| MASS | 0.7Kg | 0.1Kg |

LIGHT-EMITTING ELEMENT, LIGHT-EMITTING DEVICE, AND METHOD FOR PRODUCT LIGHT-EMITTING ELEMENT

REFERENCE TO RELATED APPLICATIONS

This application is a national stage application under 35 USC 371 of International Application No. PCT/JP2012/067135, filed Jul. 4, 2012, which claims the priority of Japanese Patent Application No. 2011-167739, filed Jul. 29, 2011, the entire contents of which are incorporated herein by reference.

FIELD OF THE INVENTION

The present invention relates to a light-emitting element provided with a phosphor (light-emitting section) which generates fluorescent light by irradiation with laser light, a light-emitting device provided with the light-emitting element, and a method for producing the light-emitting element.

BACKGROUND OF THE INVENTION

In recent years, light-emitting devices configured to employ solid light-emitting elements such as light emitting diodes (LED) or semiconductor lasers (LD; Laser Diodes) as excitation light sources and use, as illumination light, fluorescent light generated by irradiating a light-emitting section, which includes a phosphor, with excitation light generated from such excitation light sources have been more intensively studied.

It is necessary that such light sources which excite the phosphor by using solid light-emitting elements meet eye safety requirements provided in International Safety Standards IEC60825-1 and JIS C6802 and the like in Japan. It is desired to obtain a Class1 level of eye safety, in which there is no concern of loss of sight even if illumination light emitted from the light sources is directly incident on eyes via certain optical systems, mainly for applications of consumer equipment such as an illumination device.

Particularly, it is necessary to increase an apparent light source size (light-emission spot size) of laser light emitted to the outside of an illumination device in order to enhance eye safety. In addition, it is also necessary to reduce coherence of laser light.

PTL 1 discloses a light source device, in which a phosphor layer receiving excitation light and emitting fluorescent light is attached by minute concavity and convexity. More specifically, a light-emitting wheel, in which a thin diffusion layer is formed on a laser light irradiation side of a circular substrate and a phosphor is bonded to a side opposite to the laser light irradiation side is disclosed.

Next, PTL 2 discloses a light source device, in which laser light from a semiconductor laser element is diffused by a diffusing lens and then a phosphor converts the diffused light into visible light. More specifically, a technique of diffusing laser light by a diffusing lens and irradiating a phosphor with the diffused laser light is disclosed.

Next, PTL 3 discloses a flash device with a reflective plate which is composed of a laser light scattering member for uniformly scattering laser light from a semiconductor laser and coated with a plurality of types of phosphors emitting red, green, and blue fluorescent light. More specifically, a technique of scattering a laser light flux emitted from a semiconductor laser by a reflective plate is disclosed.

Next, PTL 4 discloses a light-emitting device, in which an opening capable of outputting light from a semiconductor laser element is disposed in a region different from a center axis of a light guiding member optically coupled to the semiconductor laser element and a wavelength conversion member absorbing at least part of the light from the semiconductor laser element and generating light with different wavelengths is provided between an end of the light guiding member and the opening. More specifically, according to the technique disclosed in the patent literature, an opening of a cap for protecting a light guiding member is provided in a region other than a region which coincides with a center axis of the light guiding member for guiding laser light, the laser light is diffused by an inner wall of the cap in the region which coincides with the center axis, and the laser light is changed to random light with a low coherence property.

PATENT LITERATURE

PTL 1: Japanese Unexamined Patent Application Publication No. 2010-256457 (published on Nov. 11, 2010)
PTL 2: Japanese Unexamined Patent Application Publication No. 7-282609 (published on Oct. 27, 1995)
PTL 3: Japanese Unexamined Patent Application Publication No. 2005-208333 (published on Aug. 4, 2005)
PTL 4: Japanese Unexamined Patent Application Publication No. 2008-28245 (published on Feb. 7, 2008)

SUMMARY OF INVENTION

However, since the film thickness of the diffusing layer is significantly thin compared to the circular substrate with no diffusing function in the light-emitting wheel disclosed in PTL 1, there is a problem that efficiency in increasing the light-emission spot size of the laser light while passing through the circular substrate and the diffusing layer until the laser light reaches the phosphor is low and that eye safety cannot be satisfied in practice.

In contrast, since laser light is diffused by the diffusing lens according to the technique disclosed in PTL 2, it is necessary to increase the distance between the diffusing lens and the phosphor to some extent in order to increase the light-emission spot size, and there is a problem that a degree of freedom in designing the element as a whole is low.

In addition, the technique disclosed in PTL 3 is basically not a technique of exciting the light-emitting section by irradiation with the laser light. Moreover, the technique disclosed in PTL 4 is a technique for not leaking light with a high coherence property from the cap, and there is no description regarding a viewpoint of increasing the light-emission spot size.

That is, there is no description and suggestion regarding specific measures and ideas for designs for the purpose of enhancing efficiency in increasing the light-emission point of the laser light used as excitation light in any literatures described above.

The present invention was made in view of the above problems, and an object thereof is to provide a light-emitting element which satisfies eye safety requirements by enhancing efficiency in increasing a light-emission spot size of laser light that reaches a light-emitting section and which is capable of increasing the degree of freedom in designing the element as a whole, a light-emitting device which is provided with the light-emitting element, and a method for producing the light-emitting element.

A light-emitting element according to the present invention includes: a light-emitting section which is irradiated with laser light and generates fluorescent light; and a transparent member which is arranged on a laser light irradiation side of the light-emitting section and exhibits transparency with respect to the laser light, in which the transparent member has a diffusing structure of isotropically scattering the laser light which passes therethrough and increasing a light-emission spot size of the laser light.

According to the above configuration, the diffusing structure is provided in the transparent member, and therefore, efficiency in increasing the light-emission spot size of the laser light that reaches the light-emitting section increases compared to the light-emitting wheel disclosed in PTL 1, in which the circular substrate as the transparent member and the diffusing layer with the diffusing function are separately provided.

In addition, since it is only necessary to increase the layer thickness of the transparent member provided with the diffusing structure in order to increase the light-emission spot size in the above configuration, it is possible to enhance a degree of freedom in designing the element as a whole with less restriction compared to the technique disclosed in PTL 2, in which it is necessary to increase a distance between the diffusing lens and the phosphor to some extent.

As described above, it is possible to satisfy eye safety requirements by enhancing efficiency in increasing the light-emission spot size of the laser light that reaches the light-emitting section and to increase the degree of freedom in designing the element as a whole.

According to the above configuration, the transparent member is arranged on the laser light irradiation side of the light-emitting section, and therefore, the laser light is diffused (or scattered) while passing through the inside of the transparent member, and the light-emitting section is irradiated with the laser light as light with enlarged light-emission spot size. Accordingly, it is possible to suppress only a part of the light-emitting section being extremely strongly excited or extremely strongly emitting light as compared with a case where the light-emitting section is directly irradiated with the laser light without causing the laser light to pass through the transparent member.

Furthermore, since the laser light which is emitted to the light-emitting section and is not converted into the fluorescent light is scattered (or diffused) again by the diffusing structure, and the light-emission spot size of the laser light is further enlarged, it is possible to obtain illumination light which is safe for eyes.

In order to solve the above problems, the present invention provides a method for producing a light-emitting element including a light-emitting section which is irradiated with laser light and generates fluorescent light and a transparent member which is arranged on a laser light irradiation side of the light-emitting section and exhibits transparency with respect to the laser light, the transparent member having a diffusing structure of isotropically scattering the laser light which passes therethrough and increasing a light-emission spot size of the laser light. The method for producing the light-emitting element includes: a transparent member formation process of forming the transparent member containing a plurality of scattering fine particles or air bubbles for scattering the laser light; and a light-emitting section arrangement process of arranging the light-emitting section on a side of one surface of the transparent member.

According to the method, the transparent member containing a plurality of scattering fine particles or air bubbles which scatter the laser light is formed in the transparent member formation process.

In addition, the light-emitting section is arranged on a side of one surface of the transparent member in the light-emitting section arrangement process.

According to the above method, it is possible to produce a light-emitting element which can satisfy eye safety requirements by enhancing efficiency in enlarging the light-emission spot size of the laser light that reaches the light-emitting section and can increase a degree of freedom in designing the element as a whole.

The light-emitting element according to the present invention includes a light-emitting section which is irradiated with the laser light and generates the fluorescent light and a transparent member which is provided on a laser light irradiation side of the light-emitting section and exhibits transparency with respect to the laser light, and the transparent member is configured to include the diffusing structure which isotropically scatters the laser light passing therethrough and increasing the light-emission spot size.

Accordingly, an effect of satisfying eye safety requirements by enhancing the efficiency in increasing the light-emission spot size of the laser light that reaches the light-emitting section and an effect that the degree of freedom in designing the element as a whole can be enhanced are achieved.

In addition, the method for producing a light-emitting device according to the present invention is a method including: a transparent member formation process, in which the transparent member containing a plurality of scattering fine particles or air bubbles for scattering the laser light is formed; and a light-emitting section arrangement process, in which the light-emitting section is arranged on a side of one surface of the transparent member.

Accordingly, an effect that it is possible to produce a light-emitting device capable of satisfying eye safety requirements by enhancing the efficiency in increasing the light-emission spot size of the laser light that reaches the light-emitting section and an effect that the degree of freedom in designing the element as a whole can be enhanced are achieved.

Other purposes, features, and excellent points of the present invention will be sufficiently understood from the following description. In addition, advantages of the present invention will be obviously understood from the following description with reference to accompanying drawings.

BRIEF DESCRIPTION OF DRAWINGS

FIG. 8 is a process diagram illustrating a process for forming a concave and convex structure on the transparent member, in which (a) schematically illustrates the transparent member as a starting material, (b) illustrates a state where a resist layer is formed on one surface of the transparent member (resist layer formation process), (c) illustrates a state where the resist layer is exposed to light (exposure process), and (d) illustrates a state where a part of the resist layer is removed and only the exposed portion is left (removal process).

FIG. 15 is a diagram for comparing specifications of the laser downlight and the LED downlight.

DETAILED DESCRIPTION OF THE INVENTION

Figure 1:
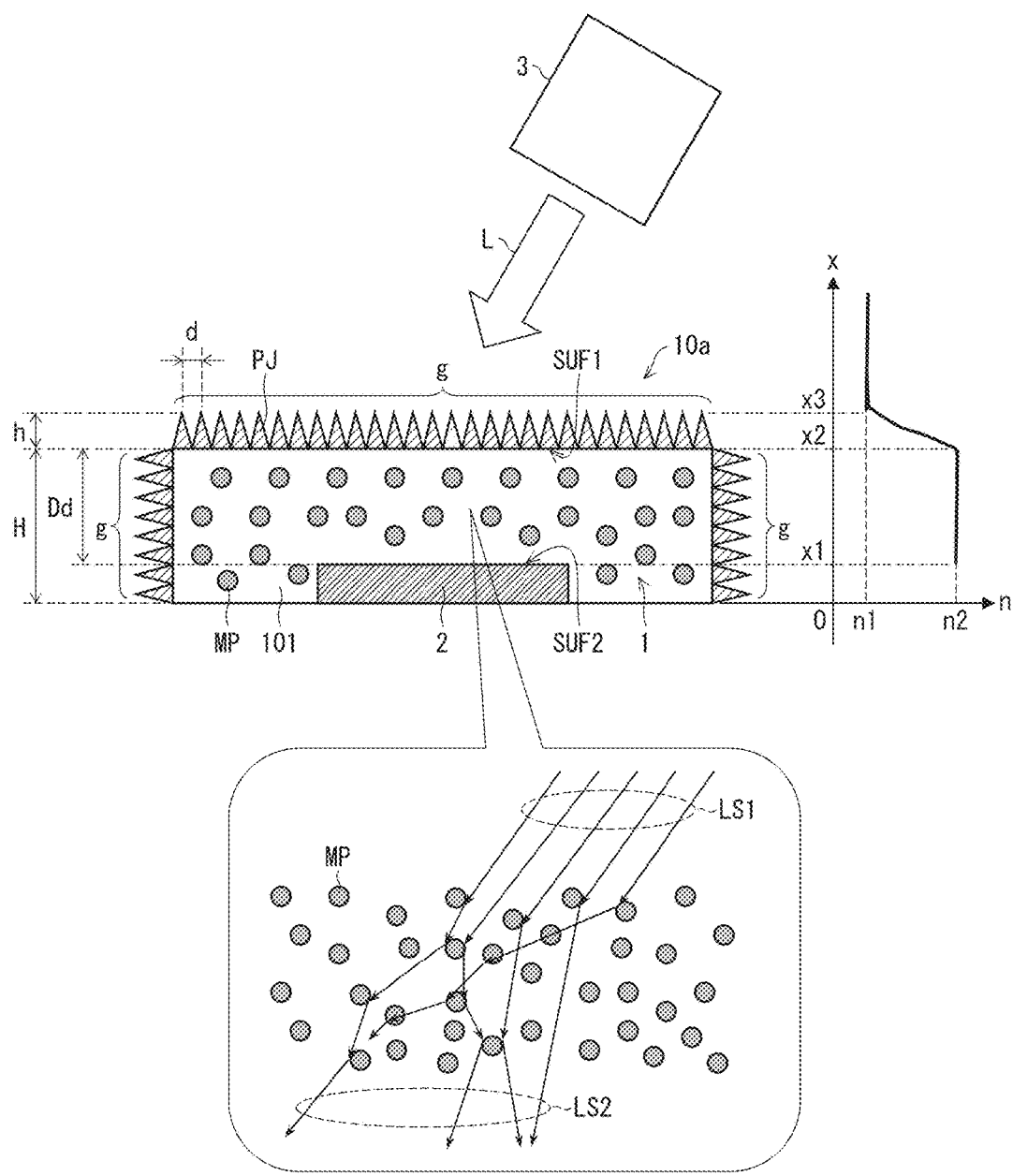
FIG. 1 is a cross-sectional view schematically illustrating a configuration of a light-emitting element according to an embodiment of the present invention.

A description will be given of an embodiment of the present invention based on FIGS. 1 to 15 as follows.

Although descriptions of configurations other than the configurations described in the following specific sections are omitted in some cases, the configurations whose descriptions are omitted are the same as those described in other sections. Same reference numerals are assigned to members with the same functions as those of members illustrated in the respective sections for convenience of explanation, and descriptions thereof will be appropriately omitted.

[1. Configuration of Light-Emitting Element 10a]

First, a description will be given of a configuration of a light-emitting element 10a according to an embodiment of the present invention based on FIG. 1. In addition, FIG. 1 is a cross-sectional view schematically illustrating the configuration of the light-emitting element 10a, and actual dimensions of the respective constituents are not reflected.

As illustrated in FIG. 1, the light-emitting element 10 is provided with a transparent member 1 and a light-emitting section 2.

<Transparent Member 1>

The transparent member 1 according to this embodiment is a plate-shaped member with no bending and exhibits transparency with respect to at least laser light L (excitation light) with a certain wavelength.

(Point for Implementing Eye Safety)

Points for implementing eye safety are described in the following two points.

(1) The first point is that a light-emission spot of laser light itself cannot be seen directly or indirectly when viewed from an observer. However, a refractive index of the light-emitting section is equal to or more than 1.5, and surface reflection of 4% or more is generated at a boundary between the air and the light-emitting section. As a result, the laser light source is seen indirectly. Therefore, prevention of surface reflection of the excitation light incident on the light-emitting section is one point.

(2) Second, preventing a state where a part of the light-emitting section locally emits strong light even if there is no reflection on the surface of the light-emitting section is the other point for implementing eye safety.

In order to implement the above (1), the light-emitting element 10a includes a reflection preventing structure g provided on a side of a light irradiation surface SUF1 of the transparent member 1, as will be described later. In doing so, it is possible to avoid a situation where the laser light source is seen indirectly via the light-emitting section.

In contrast, in order to implement the above (2), a structure (diffusing structure) in which the light-emitting section is configured so as not to strongly excite only a part of the surface thereof, and/or fluorescent light is discharged from the light-emitting section to the outside while diffusing the fluorescent light is provided between the reflection preventing structure and the light-emitting section. In doing so, the laser light emitted toward the light-emitting section is diffused (or scattered) while passing through the diffusing structure and excites the light-emitting section as light (excitation light) with an increased light-emission point size (light-emission spot size). Therefore, a situation where a small portion of the light-emitting section is excessively strongly excited or excessively strongly emits light does not occur. The fluorescent light emitted from the light-emitting section can be diffused (or scattered) while passing through the diffusing structure and emitted to the outside as uniform illumination light even if the light-emitting section is not uniformly excited. In addition, since not only the fluorescent light but also excitation light (laser light) which is not converted into the fluorescent light out of the light emitted from the light-emitting section is similarly scattered (or diffused), the light source size (light-emission point size) is increased, and safety illumination light for eyes can be acquired.

(Scattering Microregion MP)

The transparent member 1 includes at least a base material 101 and a plurality of scattering microregions MP (diffusing structure; scattered fine particles or air bubbles) distributed inside the base material 101. Although a fitting hole is provided on the bottom surface of the base material 101 and the light-emitting section 2 is fitted into (bonded to) the fitting hole in the light-emitting element 10*a* according to this embodiment, the transparent material 1 is not limited to such a configuration. For example, the base material 101 and the light-emitting section 2 may not be bonded, and a gap may be provided between the base material 101 and the light-emitting section 2.

If the light-emitting element 10*a* is a pseudo white system using part of the excitation light (laser light L, for example) as illumination light, it is preferable that the periphery of the light-emitting section 2 be entirely covered as illustrated in FIG. 1. On the other hand, only a part of the light-emitting element 2 may be covered in a case of a system which does not use part of the excitation light as illumination light.

The transparent member 1 converts laser light with a high coherent property (spatial coherency) and an extremely small light-emission spot size (light-emission point size) into light with a low coherent property and a large light-emission spot size which hardly affects a human body by isotropically diffusing (scattering) the laser light L passing through the inside of the transparent member 1 by the plurality of scattering microregions MP. That is, the plurality of scattering microregions MP represent a diffusing structure for increasing the light-emission spot size (apparent light source size) of the light-emitting element 10*a*.

Inside the balloon in FIG. 1, a state where a light-emission spot LS1 is enlarged to a light-emission spot LS2 by the plurality of scattering microregions MP is schematically illustrated.

Here, a description will be given of the significance of inclusion of the scattering microregions MP in the transparent member 1.

If light with high energy emitted from a light source of a small spot is incident on a human eye, a light source image is focused on a portion, which is as small as the spot size, on a retina, and therefore, energy concentration at the portion where the image is formed extremely increases. For example, laser light emitted from a semiconductor laser has a light-emission spot size which is smaller than a 10 μm square in some cases. If such light emitted from a light source is directly incident on an eye, or even if such light is incident on the eye via optical members such as a lens and mirror, the portion where the image is formed on the retina is damaged in some cases as long as the light is incident on the eye such that the small light-emission point can be directly seen.

In order to avoid this, it is necessary to increase the light-emission spot size to be equal to or more than specific finite size (specifically, equal to or more than 1 mm×1 mm, for example).

A light-emission spot size of a typical high-output semiconductor laser is 1 μm×10 μm, for example. The area thereof is 10 μm$^2$=1.0×10$^{-5}$ mm$^2$. That is, energy concentration in a region where an image is formed on a retina is 10$^5$ times as high as that of light with the same energy as compared with a light source with a light-emission point of 1 mm$^2$.

Since it is possible to increase an image forming size on a retina by increasing the light-emission spot size, energy concentration on a retina can be reduced even if light with the same energy is incident on the eye.

It is necessary that the light-emission point of the light source itself cannot be visually recognized when the light-emission spot size increases. In order to do so, a plurality of scattering microregions MP are provided in the transparent member 1 of the light-emitting element 10*a* according to this embodiment, and the laser light L is isotropically diffused by the plurality of scattering microregions MP.

In addition, it is necessary to take not only a laser light source but also an LED light source into consideration in relation to the increase in the light-emission spot size.

However, since laser light is monochromatic, that is, laser light has uniform wavelength compared to light emitted from the LED light source, blur of the formed image (so-called chromatic aberration) on the retina due to a difference in wavelength does not occur, and the laser light is more risky than the light emitted from the LED light source. Accordingly, it is preferable to take an increase in a light-emission spot size into consideration especially for a light-emitting device which uses light emitted from a laser light source as illumination light.

Since the plurality of scattering microregions MP are provided inside the transparent member 1 in the light-emitting element 10*a* as described above, efficiency in increasing the light-emission spot size before the light reaches the light-emitting section 2 is enhanced as compared with the light-emitting wheel disclosed in PTL 1, in which the circular substrate (transparent member) and the diffusing layer with the diffusing function are separately provided.

Since it is only necessary to increase a thickness H of the transparent member 1 with the diffusing structure (more strictly, increase a diffusing distance Dd) in order to increase the light-emission spot size of the light-emitting element 10*a*, there is less restriction compared to the technique disclosed in PTL 2 which requires to increase a distance between the diffusing lens and the phosphor to some extent), and it is possible to enhance a degree of freedom in designing the light-emitting element 10*a* as a whole.

As described above, it is possible to enhance the efficiency in increasing the light-emission spot size of the laser light L before the laser light L reaches the light-emitting section 2 and enhance the degree of freedom in designing the light-emitting element 10*a* as a whole.

In addition, since the transparent member 1 is arranged on a side, which is irradiated with the laser light L, in the light-emitting section 2, laser light L is diffused (or scattered) while passing through the inside of the transparent member 1, and the light-emitting section 2 is irradiated with the laser light L as light with an enlarged light-emission spot size. Accordingly, it is possible to suppress extremely strong excitation and strong light emission of a small part of the light-emitting section 2 as compared with a case where the light-emitting section 2 is directly irradiated with the laser light L without causing the laser light L to pass through the transparent member 1.

Furthermore, since the laser light L, with which the light-emitting section 2 is irradiated, which is not converted into fluorescent light, [which is reflected by a surface SUF2 of the light-emitting section 2 (a surface on the side irradiated with the laser light) and a surface of the phosphor particles contained in the light-emitting section 2] is scattered (or diffused) again by the diffusing structure, the light-emission spot size of the laser light L is further enlarged. Accordingly, it is possible to acquire illumination light which is safe for eyes.

In addition, the diffusing structure of the transparent member 1 may be a structure of isotropically scattering fluorescent light generated from the light-emitting section 2 and increasing the light-emission spot size thereof.

In doing so, since the fluorescent light generated from an extremely small part of the light-emitting section 2 is diffused (or scattered) while passing through the inside of the transparent member 1 even if the small part (light-emission spot) is extremely strongly excited and strongly emits light, and the fluorescent light is emitted as light with the enlarged light-emission spot size from the light-emitting section 2 to the outside, it is possible to acquire illumination light which is safe for eyes.

(Base Material 101)

The base material 101 of the transparent member 1 is composed of inorganic glass such as quartz ($SiO_2$: refractive index n=1.45), BK-7 (Borosilicate Crown-7; optical glass: refractive index n=1.51), or low-melting-point glass (refractive index n=1.76, for example) or transparent resin such as silicone resin (refractive index n=1.43). In order to obtain thermal conductivity of 20 W/mK or higher for the base material 101, sapphire ($Al_2O_3$), magnesia (MgO), gallium nitride (GaN), or spinel ($MgAl_2O_4$) may be used, as will be described later.

Other examples of the transparent resin which can be used for the transparent member 1 include thermoplastic resin and thermosetting resin, and it is possible to use polycarbonate resin, acrylic resin, fluorine acrylic resin, silicone acrylic resin, epoxy acrylate resin, polystyrene resin, cyclo-olefin polymer, methyl styrene resin, fluorine resin, polyethylene terephthalate (PET), polypropylene, acrylnitrile-styrene copolymer, acrylonitrile-polystyrene copolymer, or the like.

(Minute Scattering Regions MP)

The scattering microregions MP contain any of scattering fine particles with a refractive index which is different from that of the base material 101 and air bubbles (refractive index n of the air=1.0). In doing so, it is possible to adjust the property of the transparent member 1 scattering the laser light L by adjusting density and distribution of the scattering fine particles or the air bubbles in the transparent member 1.

(Scattering Fine Particles)

In addition, any scattering fine particles may be used as long as the particles have an effect of diffusing (or scattering) light and can withstand heat generated when the transparent member 1 is manufactured, and for example, transparent fine particles made of an inorganic substance or resin can be used. Examples of available transparent fine particles made of an inorganic substance include diamond (refractive index n=2.42), fine particles made of an oxidative product such as fumed silica, quartz ($SiO_2$: refractive index n=1.45), alumina ($Al_2O_3$: refractive index n=1.76), magnesium oxide (MgO: refractive index n=1.72), titania ($TiO_2$; titanium dioxide: refractive index n=2.52), or zirconium oxide (refractive index n=2.4) or other particles of calcium carbonate, barium sulfate, or the like.

Examples of available scattering fine particles made of resin include particles made of: acrylic resin, styrene resin, acrylic styrene resin, or cross-linked materials thereof; or melamine-formaldehyde resin; fluorine resin or silicone resin such as polytetrafluoroethylene, perfluoroalkoxy resin, tetrafluoroethyrene-hexafluoropropylene copolymer, polyfluorovinylidene, or ethylene tetrafluoroethylene.

Here, since the wavelength of the laser light L is substantially equal to or more than 350 nm (nanometer) and equal to or less than 700 nm, as will be described later, scattering fine particles with an average particle size (particle size) which is of the similar order to the wavelength of the laser light L (that is, the order of 100 nm) can contribute to scattering of light. In other words, the particle size of the scattering fine particles is required to be equal to or more than 100 nm in order to cause the light scattering property to appear. In addition, the particle sizes of individual scattering fine particles are preferably of a larger order than the wavelength of the laser light L and are preferably equal to or more than 700 nm in order to cause the diffusing function to preferably appear. Accordingly, the average particle size of the scattering fine particles is preferably equal to or more than 700 nm and is preferably about 1 μm.

(Air Bubbles)

Air bubbles may be used as the scattering microregions MP. Inner surfaces of the air bubbles formed inside the base material 101 causes irregular reflection of the light, and a diffusing function which is the same or more than that in a case where the scattering fine particles are dispersed can be made to appear.

(Thermoplastic Resin)

In addition, thermoplastic resin may also be used as the base material 101. As such a base material 101, it is possible to exemplify white PET (polyethylene terephthalate) and white PP (polypropylene). White PET is formed by dispersing resin with no compatibility with PET or filler such as titania ($TiO_2$), barium sulfate ($BaSO_4$), or calcium carbonate ($CaCO_3$) in PET, then stretching the PET by a biaxial stretching method, and thereby generating air bubbles around the filler.

In addition, the base material 101 made of thermoplastic resin may be stretched in at least a single axis direction. This is because it is possible to generate air bubbles around the filler by stretching the base material 101 in at least a single axis direction.

Examples of available thermoplastic resin include polyester-based resin such as acrylonitrile polystyrene copolymer, polyethylene terephthalate (PET), polyethylene-2,6-naphlate, polypropylene terephthalate, polybutylene terephthalate, cyclohexanedimethanol copolymer polyester resin, isophthalic acid copolymer polyester resin, spiroglycol copolymer polyester resin, and fluorene copolymer polyester resin, polyolefin-based resin such as polyethylene, polypropylene, polymethylpentene, and alicyclic olefin copolymer resin, acrylic resin such as polymethylmethacrylate, polycarbonate, polystyrene, polyamide, polyether, polyesteramide, polyetherester, polyvinyl chloride, cycloolefin polymer, and copolymer containing as constituent polycarbonate, polystyrene, polyamide, polyether, polyesteramide, polyetherester, polyvinyl chloride, or cycloolefin polymer, and mixture of the above resin, with no particular limitation.

(Difference Between Refractive Indexes of Base Material and Minute Scattering Regions MP)

Next, a description will be given of a difference between refractive indexes of the base material 101 and the scattering microregions MP. Generally, light passing through two adjacent materials can be more easily reflected by a boundary of these substances as a difference between refractive indexes of the materials increases. Accordingly, it is possible to more effectively scatter the laser light L as the difference between the refractive index n of the scattering microregions MP and the refractive index n of the base material 101. From such a viewpoint, the difference between the refractive indexes n of the base material 101 and the scattering microregions MP is preferably at least equal to or more than 0.25.

In addition, if inorganic glass is used as the base material 101, the refractive index n of the inorganic glass ranges from about 1.5 to about 1.8, and therefore, the refractive index of the scattering microregions MP preferably ranges from about 1.7 to about 2.0 and is more preferably equal to or more than 2.0 in order to more reliably achieve the diffusing effect.

For example, the refractive index n of zirconium oxide is 2.4, and the refractive index n of diamond is 2.42. By using such a substance with a high refractive index n as the scattering microregions MP, it is possible to enhance the effect of diffusing the laser light L.

Since a melting point of zirconium oxide is 2715° C., and a melting point of diamond is 3550° C., zirconium oxide and diamond do not melt and properties thereof do not change at a general melting temperature of the transparent member 1. From such a point, zirconium oxide and diamond are preferable as materials to be dispersed as the scattering microregions MP in the base material 101.

In addition, it is preferable to employ scattering microregions MP with high transparency. In a case of scattering microregions MP with low transparency, there is a possibility that the scattering microregions MP blocks or absorbs the laser light L from a semiconductor laser (laser light source) 3, which will be described later, and the fluorescent light generated by (the phosphor contained in) the light-emitting section 2. Accordingly, transparency of the scattering microregions MP is preferably high from a viewpoint of efficiency in using the laser light L.

From a viewpoint of transparency, zirconium oxide and diamond are preferable as the scattering microregions MP due to the high transparency.

Silica which is often used as diffusing fine particles has a refractive index n=1.46 and exhibits a low scattering effect in inorganic glass (refractive index: 1.5 to 1.8). In addition, Since $Y_2O_3$ (yttiria; refractive index n=1.91) used for the same purpose has a refractive index n of less than 2 which is not significantly different from the refractive index of low-melting-point glass, $Y_2O_3$ exhibits a low diffusing effect in the low-melting-point glass.

On the other hand, a reflectance by the scattering microregions MP (scattering fine particles or air bubbles) in the diffusing structure decreases as the difference between the refractive indexes decreases. In a case of a diffusing structure obtained by dispersing alumina ($Al_2O_3$: refractive index n=1.76) powder in a typical glass material (refractive index n=1.5), for example, the difference between the refractive indexes is 0.26. In this case, the reflectance is 0.6%. Since the reflectance is not significantly high when the difference between the refractive indexes is equal to or more than 0.25 and less than 0.5 as described above, density of the scattering microregions MP preferably ranges from 20% to 35% by volume (Vol %).

However, when the difference between the refractive indexes is equal to or more than 0.5, the density of the scattering microregions MP preferably ranges from 5% to 20% by volume. This is because while it is necessary to increase the density in order to increase a degree of scattering (or diffusion) when the difference between the refractive indexes is small (=the reflectance is low), it is not necessary to significantly increase the density of the scattering microregions MP since the reflectance is high when the difference between the refractive indexes is large.

In addition, the density of the scattering microregions MP is substantially not related to the increase in the light-emission spot size except for a case of extremely low temperature, such as a case where light is directly emitted from the light-emitting section 2 (regardless of the diffusing structure). Accordingly, it is necessary to increase the thickness (=the diffusing distance Dd illustrated in FIG. 1) of the diffusing structure in order to increase the light-emission spot size, as will be described later in detail.

In addition, a level of the diffusing function is defined by a haze value, parallel light transmittance, and the like. A haze value of the transparent member 1 is preferably equal to or more than 25% depending on the thickness thereof, and total light transmittance is preferably equal to or more than 75%.

Here, the haze value=[(total light transmittance−parallel light transmittance)/total light transmittance]*100 is satisfied.

(Concerning Diffusing Distance)

The diffusing distance Dd is preferably equal to or more than a size S of the light-emitting section required for implementing eye safety.

As described above, the scattering microregions MP are dispersed in the transparent member 1, and light is isotropically scattered. Here, isotropic scattering represents a state where a degree, at which light advances in a thickness direction (z direction; see FIG. 2) of the diffusing direction, is equal to a degree, at which light advances in a direction (x direction) orthogonal to the thickness direction of the diffusing structure.

Figure 2:
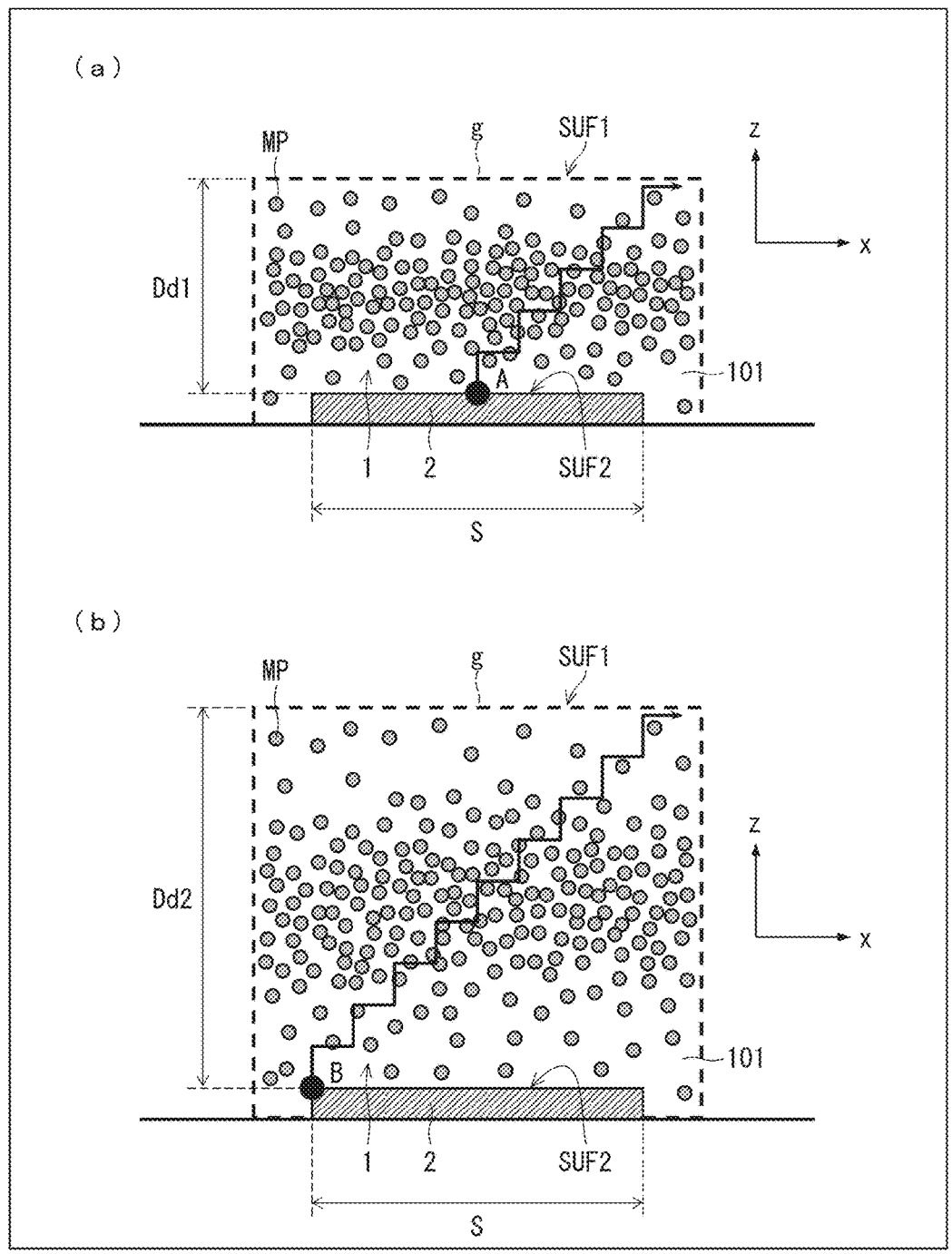
FIG. 2 is an explanatory diagram illustrating a relationship between a layer thickness of the diffusing structure and a laser light diffusing function by the transparent member with respect to the light-emitting element, in which (a) illustrates a state where the layer thickness of the diffusing structure is thin, and (b) illustrates a state where the layer thickness of the diffusing structure is thick.

It is assumed that directions, in which light advances, are represented as the x direction and the z direction as illustrated in FIG. 2, for example. In addition, the reflection preventing structure g is illustrated by a thick broken line, as necessary, in order to avoid complication in FIG. 2 and the following drawings.

At this time, the light emitted from the light-emitting section 2 advances in the z direction by the same distance as the distance, by which the light advances in the x direction. The light generated from a center A of the light-emitting section 2 as illustrated in FIG. 2(*a*), for example, advances in the z direction by a length of S/2 which is a half of the size of the light-emitting section 2 (light-emitting section size S) while advancing in the x direction by the length of S/2 (that is, the light is scattered).

On the other hand, it can be said that the light-emission spot size of the light emitted from an end B of the light-emitting section 2 illustrated in FIG. 2(*b*) is enlarged by L while the light advances through the inside of the diffusing structure when the diffusing distance Dd=light-emitting size S if it is considered in the same manner as above.

If it is assumed that the light-emitting section 2 has a minimum size required from the viewpoint of eye safety although the light-emitting section size S is arbitrary, the diffusing distance Dd is required to be equal to or more than the light-emitting section size S.

In other words, it is possible to implement eye safety regardless of the light-emitting section size S as long as a diffusing structure with the same thickness of the light-emission spot size required for eye safety, which is required based on the brightness, the wavelength, and the size thereof is provided.

In addition, the light-emitting section size S is not necessarily the same in a plane in the x direction (that is, not necessarily a regular square). In this case, it is only necessary that the diffusing structure have the same thickness as the light-emitting section size S in a short side direction (shorter side direction) if the light-emitting section is formed to have the size S which does not cause any problems in terms of eye safety. This is because the light-emitting section 2 has a size for implementing eye safety at least on the shorter side. If the size of the light-emitting section 2 does not meet the size required for eye safety, the diffusing distance Dd which is equal to or more than a lower limit of the size required for the eye safety is applicable.
(Concerning Maximum Permissible Exposure)

Next, the thickness H (more strictly, the diffusing distance Dd) of the transparent member 1 is preferably equal to or more than ½ of the thickness, with which the laser light L passing through the inside of the transparent member 1 and emitted to the outside is light of equal to or less than a maximum permissible exposure, from another viewpoint.

In doing so, the laser light L reflected by the light-emitting section 2, passing through the inside of the transparent member 1, and emitted to the outside is light of equal to or less than the maximum permissible exposure, and therefore, it is possible to obtain fluorescent light (illumination light) which is safer for eyes.
(Relationship with Light-Emitting Section Size)

The minimum diameter of the surface SUF2 of the light-emitting section 2 is at least equal to or less than the thickness H of the transparent member 1, and the maximum diameter of the surface SUF2 is preferably equal to or less than the thickness H of the transparent member 1, from still another viewpoint. In other words, it is possible to implement eye safety regardless of a state of the fluorescent light emitted from the light-emitting section 2 as long as the thickness H of the transparent member 1 is at least equal to or more than the minimum diameter (more preferably equal to or more than the maximum diameter) of the surface SUF2 of the light-emitting section 2.
(Concerning Distribution States of Minute Scattering Regions MP)

Next, a description will be given of distribution states of the scattering microregions MP in the transparent member 1 based on FIG. 3. Although the distribution state of the scattering microregions MP in the transparent member 1 may be uniform, distribution states described herein may be employed.

Figure 3:
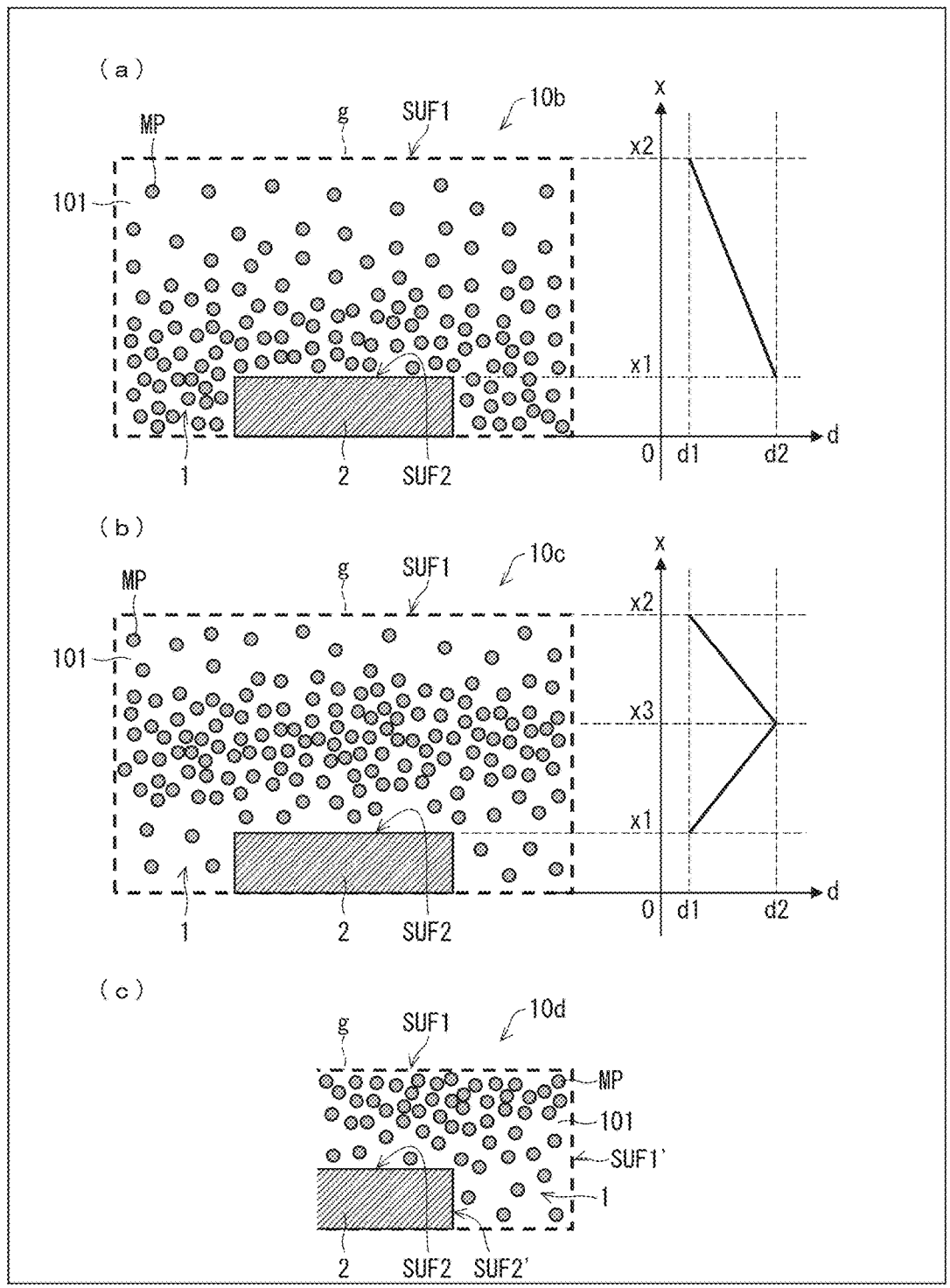
FIG. 3 is a cross-sectional view schematically illustrating a configuration example of the diffusing structure which is formed inside the transparent member with respect to the light-emitting element, in which (a) illustrates a configuration example of the diffusing structure, (b) illustrates another configuration example of the diffusing structure, and (c) illustrates still another configuration example of the diffusing structure.

FIG. 3 is a cross-sectional view schematically illustrating a configuration example of the diffusing structure formed inside the transparent member 1, FIG. 3(a) illustrates a configuration example of the diffusing structure, FIG. 3(b) illustrates another configuration example of the diffusing structure, and FIG. 3(c) illustrates still another configuration example of the diffusing structure.

As illustrated in FIG. 3(a), the density of the scattering microregions MP may be lower on the side of the light irradiation surface SUF1 of the transparent member 1, which is irradiated with the laser light L (density d1<density d2). In doing so, it is possible to suppress unnecessary decrease in the amount of the laser light which reaches the light-emitting section 2 after being incident on the transparent member 1 and reflected by the presence of the scattering fine particles or the air bubbles.

Next, as illustrated in FIG. 3(b), the density of the scattering microregions MP may be lower on the side closer to the light-emitting section 2 of the transparent member 1 (the side of the surface SUF2 of the light-emitting section 2) (density d1<density d2). In doing so, it is possible to suppress reflection of the fluorescent light generated by the light-emitting section 2 by the presence of the scattering fine particles or the air bubbles on the side closer to the light-emitting section 2 of the transparent member 1.

In addition, if side emission of the fluorescent light from the surface SUF2' of the light-emitting section 2 (emission in the horizontal direction, a direction toward a closer side, and a direction toward a further side of the plane of paper) as illustrated in FIG. 3(c) is taken into consideration, the density of the scattering microregions MP is preferably low at a side emitting portion and high at a periphery thereof.
(Reflection Preventing Structure)

Next, a description will be given of the reflection preventing structure g. As illustrated in FIG. 1, the so-called reflection preventing structure g (concave and convex structure) composed of a plurality of minute projections (convex portions) PJ is formed on the light irradiation surface SUF1 (or on the side of the light irradiation surface SUF1) as a surface of the transparent member 1 (on the side irradiated with the laser light L). Although a description will be given of this embodiment with a configuration, in which the reflection preventing structure g is made of the plurality of minute projections PJ, the reflection preventing structure g is not limited thereto and may have a structure including a plurality of minute holes (concave portions), as will be described later, for example. As examples of the reflection preventing structure g, it is possible to exemplify a reflection preventing film (optical thin film) composed of resin in addition to such a minute structure. In addition, any materials may be used as a constituent material of the reflection preventing film as long as the material can prevent reflection at the wavelength of the irradiation laser light, and it is possible to exemplify low-refractive-index resin [fluorine-based resin or the like] such as polytetrafluoroethylene (PTFE). In addition, the layer thickness of the reflection preventing film is formed into about 100 nm to about 100 μm, and the reflection preventing film is formed on the side of the light irradiation surface SUF1 of the transparent member 1 by a wet process (such as screen printing).

Here, the "convex portions" represent projections PJ extending in the irradiation direction of the laser light L as in the reflection preventing structure g as illustrated in FIG. 1, or portions locally projecting in the irradiation direction of the excitation light between the concave portions (including the state of portions projecting between most adjacent minute holes PH as illustrated in FIG. 4(d)). In addition, the "concave portions" represent minute holes PH with depth in the irradiation direction of the laser light L or portions locally depressed in the irradiation direction of the excitation light between the convex portions (including the state of portions depressed between most adjacent projections PJ).

An interval d between the respective projections PJ (or the respective minute holes PH) (an interval, at which reflection can be reduced) is preferably equal to or more than 5 nm and equal to or less than 3000 nm, and more preferably equal to or more than 5 nm and equal to or less than 1500 nm.

If the interval d is less than 5 nm, it is difficult to form the reflection preventing structure g. Here, it is assumed that a width of the projection PJ (convex portion) in a direction parallel to the light irradiation surface SUF1 is referred to as a convex portion width. At this time, a relation that the interval, at which reflection can be reduced≈the convex portion width is satisfied.

Since a preferable upper limit of a height h of the projection PJ is 3000 nm, as will be described later, an aspect ratio (convex portion height/convex portion width) of the projection PJ is less than 1 when the interval d exceeds 3000 nm, and therefore, it becomes difficult to achieve a sufficient effect of reducing the reflectance. In addition, the wavelength of the laser light L is preferably equal to or more than 350 nm (nanometer) and equal to or less than 1000 nm.

This is because the phosphor which can be used for the light-emitting section 2 can be efficiently excited at the wavelength of 350 nm or more in general.

However, if a semiconductor laser is used as an excitation light source, it is difficult to manufacture a semiconductor laser which generates laser light L with a wavelength of less than 350 nm in the present circumstance. On the other hand, it is not possible to efficiently excite the phosphor with the laser light L with a wavelength of more than 1000 nm and obtain fluorescent light in a visible light region.

In addition, an oscillation wavelength of the semiconductor laser is preferably about 450 nm. Moreover, the oscillation wavelength may be equal to or more than about 350 nm and equal to or less than about 470 nm. This is because it is possible to efficiently excite the phosphor and implement enhancement in efficiency of the light-emitting device in this wavelength range.

The height h of each projection PJ (the height of the convex portion in the vertical direction of the light irradiation surface SUF1) is preferably equal to or less than 3000 nm. If the height of each projection PJ exceeds 3000 nm, it becomes difficult to sufficiently obtain the effect of reducing the reflectance and form the projections PJ. Other features of the reflection preventing structure g will be described later.

Next, the light-emitting section 2 is arranged on the side opposite to the light irradiation surface SUF1 of the transparent member 1, and the side opposite to the light irradiation surface SUF1 is thermally coupled to the light-emitting section 2 (that is, such that thermal energy can be exchanged). Although this embodiment will be described on the assumption that the transparent member 1 and the light-emitting section 2 are bonded (made to adhere) by using adhesion, a method for bonding the transparent member 1 and the light-emitting section 2 is not limited to adhesion and may be fusion, for example.

Although a so-called organic adhesion or glass paste adhesion is preferably used as the adhesion, the adhesion is not limited thereto.

Since the transparent member 1 has the shape and the connection state with the light-emitting section 2 as described above, the light-emitting efficiency of the light-emitting section 2 is enhanced, and efficiency in extracting florescent light passing through the transparent member 1 from the light-emitting section 2. Since it is possible to discharge heat generated from the light-emitting section 2 to the outside of the light-emitting element 10a while maintaining the light-emitting section 2 according to the transparent member 1, efficiency in cooling the light-emitting section 2 is enhanced.

Thermal conductivity of the transparent member 1 is preferably equal to or more than 20 W/Mk (watt/meter Kelvin) in order to efficiently let the heat of the light-emitting section 2 out. In such a case, the transparent member 1 has a thermal conductivity which is twenty times as high as that of the light-emitting section 2 (1 W/mK) and can cool the light-emitting section 2 by efficiently absorbing the heat generated in the light-emitting section 2.

In addition, the laser light L which is incident on the light irradiation surface SUF1 is made to transmit through the transparent member 1 for irradiation of the light-emitting section 2. Accordingly, the transparent member 1 is preferably made of a material with excellent translucency.

If the above points are taken into consideration, sapphire ($Al_2O_3$), magnesia (MgO), gallium nitride (GaN), or spinel ($MgAl_2O_4$) as well as inorganic glass such as quartz, BK-7, or low-melting-point glass or transparent resin such as silicone resin as described above may be used as the material of the base material 101. By using such a material, thermal conductivity of 20 W/mK or more can be achieved.

However, since magnesia has a deliquescent property, there is a possibility that the reflection preventing structure g is damaged due to the deliquescent property. Therefore, a periphery of the transparent member 1 is filled with dried air if magnesia is selected as the constituent material of the transparent member 1. For example, the light-emitting element 10a is accommodated in a case body which is not illustrated in the drawing and the case body is filled with the dried air and sealed, or the light-emitting element 10a is accommodated inside a half-parabola-type reflecting mirror (reflecting mirror) 4h and a laser cut filter 8a which will be described later or inside a parabola-type reflecting mirror (reflecting mirror) 4 and the optical member 8b and the space is filled with the dried air and sealed. In doing so, it is possible to prevent the reflection preventing structure g from being damaged due to the deliquescent property. Alternatively, there is also a method in which the reflection preventing structure g is formed of a material with a low water permeability and the periphery of the transparent member 1 is entirely covered with the reflection preventing structure g.

In addition, the thickness H of the transparent member 1 (more strictly, the diffusing distance Dd) as illustrated in FIG. 1 is preferably equal to or more than 30 μm and equal to or less than 1.0 mm and more preferably equal to or more than 0.2 mm and equal to or less than 1.0 mm.

In a case of a reflective-type light-emitting device (light-emitting device) 20 which will be described later, the heat discharging efficiency with respect to the transparent member 1 is higher compared to the transparent-type light-emitting device (light-emitting device) 30, it is not possible to sufficiently discharge the heat of the light-emitting section 2 if the thickness H of the transparent member 1 is less than 30 μm, and there is a possibility that the light-emitting section 2 deteriorates. In addition, there is also a possibility that the reflection preventing structure g is affected by the heat generated from the light-emitting section 2 and damaged.

However, even the transparent-type light-emitting device 30 can sufficiently discharge the heat of the light-emitting section 2 and prevent the light-emitting section 2 from deteriorating if the thickness of the transparent member 1 is equal to or more than 0.2 mm. In addition, it is possible to prevent the reflection preventing structure g from being affected by the heat generated from the light-emitting section 2 and damaged.

On the other hand, if the thickness H of the transparent member 1 exceeds 1.0 mm, a degree of the laser light L emitted toward the light-emitting section 2 being absorbed by the transparent member 1 increases, and the efficiency in using the laser light L significantly deteriorates.

In addition, even if extremely strong laser light L, by which the heat generation in the light-emitting section 2 exceeds 1 W (watt), is emitted, the heat generation is quickly and efficiently discharged, and it is possible to prevent the light-emitting section 2 from being damaged (degraded) by bonding the transparent member 1 with an appropriate thickness H to the light-emitting section 2.

Although the transparent member 1 may have a flat shape with no bending as described above, the transparent member 1 may have a bent portion or a curved portion. However, in a case of bonding the transparent member 1 to the light-emitting section 2, the portion, to which the light-emitting section 2 is bonded, is preferably a plane (flat shape) from a viewpoint of adhesion stability.

(Concerning Minute Structure)

Next, a description will be given of the aforementioned minute structure. In a simple expression, the minute structure is a concave and convex structure, in which the plurality of minute projections PJ or the plurality of minute holes PH are densely aligned at the interval d, capable of reducing the reflection of the laser light L on the light irradiation surface SUF1. As an example of such a minute structure, a moth-eye structure has been widely known. However, the minute structure described herein is not limited to the moth-eye structure.

Although the transparent member 1 according to this embodiment will be described on the assumption that the plurality of projections PJ configuring the reflection preventing structure g are densely aligned along the light irradiation surface SUF1 at the interval d which is smaller than the wavelength of the laser light L as illustrated in FIG. 1, the projections PJ may be densely aligned along the light irradiation surface SUF1 at an interval which is larger than the wavelength of the laser light L as long as the interval is of the order of nanometer. For example, the reflectance decreases even in a case of an interval of about 500 nm with respect to the light with a wavelength of about 400 nm. According to the above configuration, the reflectance of the laser light L on the light irradiation surface 1 is reduced.

Although only the interval d in a direction along the plane of paper is illustrated in FIG. 1, it is also possible to define an interval in a direction orthogonal to the plane of paper.

In this embodiment, a description will be given on the assumption that the interval d in the direction along the plane of paper is the same as the interval in the direction orthogonal to the plane of paper and that the plurality of projections PJ (or the plurality of minute holes PH) are aligned in a dot matrix shape with a constant periodicity on the light irradiation surface SUF1. However, the alignment of the respective projections PJ is not limited thereto, and the interval d in the direction along the plane of paper may be different from the interval in the direction orthogonal to the plane of paper, for example.

In addition, the alignment of the reflection preventing structure g is not limited to the alignment with periodicity as in the aforementioned example, and the alignment of the respective projections PJ along the light irradiation surface SUF1 may not have periodicity with respect to at least one direction. Since occurrence of diffracted light of the laser light L is suppressed in the direction, in which the alignment of the respective projections PJ does not have periodicity, with such alignment, a reflectance R of the laser light L by the transparent member 1 is further reduced.

In addition, the alignment of the reflection preventing structure g may be random alignment with substantially no periodicity. Here, random alignment means alignment with no periodicity with respect to at least two different directions, and a random property increases as the number of the directions with no periodicity increases.

Since occurrence of diffracted light of the laser light L is further suppressed as the random property increases, the reflectance R of the laser light L by the transparent member 1 is further reduced.

Next, a description will be given of a shape of each projection PJ. In the example illustrated in FIG. 1, the projection PJ has a tapered shape such as circular cone shape or a pyramid shape. However, the shape of each projection PJ is not limited thereto, and various shapes can be considered. For example, it is possible to exemplify, as such a shape, a bell shape (or a tholoid (lava dome) shape), and a Konide (composite volcano) shape.

(Preferable Shape of Minute Structure)

Figure 4:
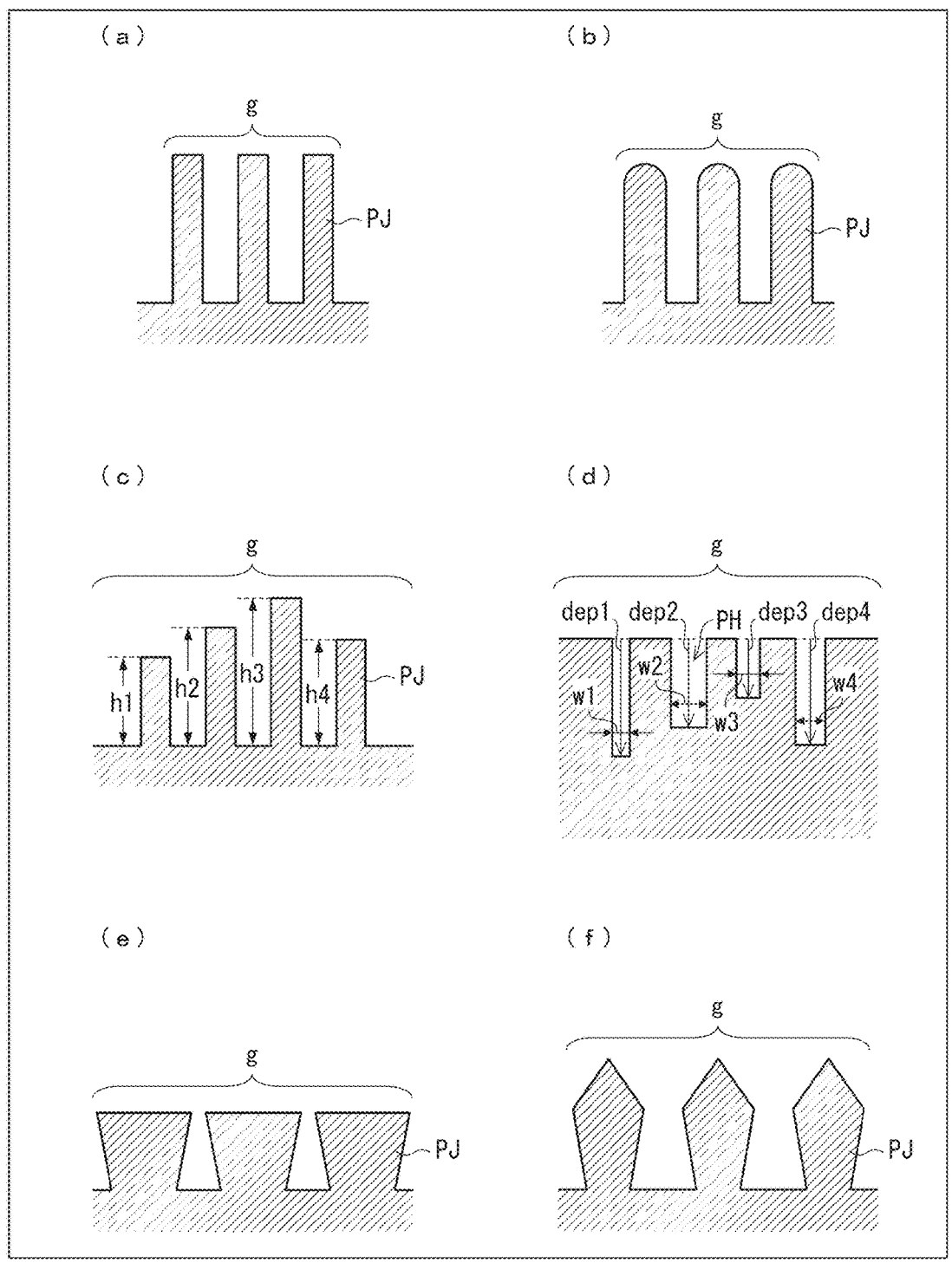
FIG. 4 is a cross-sectional view schematically illustrating configuration examples of a reflection preventing structure which is formed on a side of a light irradiation surface of the transparent member with respect to the light-emitting element, in which (a) illustrates a configuration example of the reflection preventing structure, (b) illustrates another configuration example of the reflection preventing structure, (c) illustrates still another configuration example of the reflection preventing structure, (d) illustrates still another configuration example of the reflection preventing structure, (e) illustrates still another configuration example of the reflection preventing structure, and (f) illustrates still another configuration example of the reflection preventing structure.

Next, a description will be given of specific examples of the minute structure (reflection preventing structure g) based on FIGS. 4 and 5.

First, in the example illustrated in FIG. 4(a), a diameter of each projection PJ in a direction orthogonal to the light irradiation surface SUF1 is always constant from the root of the projection PJ to the side of the tip end in the reflection preventing structure g.

Next, in the example illustrated in FIG. 4(b), the diameter of each projection PJ in the direction orthogonal to the light irradiation surface SUF1 is always constant from the side of the root to a vicinity of the tip end of the projection PJ, and a diameter of a cross section of the tip end is successively reduced. Here, "successively" means that the diameter of the cross-section of the projection PJ in parallel with the light irradiation surface SUF1 "smoothly" varies in an extending direction of the projection PJ and there is no significant "irregularity" in the variation in the diameter of the cross section.

Next, in the example illustrated in FIG. 4(c), projections PJ with different convex portion heights h1 to h4 (lengths from the roots to the tip ends of the projections PJ) stand together.

Next, in the example illustrated in FIG. 4(d), the reflection preventing structure g is a group of a plurality of minute holes PH instead of a group of a plurality of convex portions. The reflection preventing structure g may be a group of the plurality of minute holes PH as in this example.

In addition, the concave portion depths dep1 to dep4 in a direction orthogonal to the light irradiation surface SUF1 are mutually different, and the concave portion widths w1 to w4 in the direction parallel to the light irradiation surface SUF1 are mutually different in the example illustrated in FIG. 4(d).

Next, in the example illustrated in FIG. 4(e), the diameter of each projection PJ (convex portion width) successively increases from the side of the root to the side of the tip end of the projection PJ.

Next, in the example illustrated in FIG. 4(f), the diameter of each projection PJ (convex portion width) successively increases from the side of the root to the vicinity of the tip end of the projection PJ, and the diameter of the projection PJ is successively reduced from the mid-way thereof.

Although various states can be considered as states of the reflection preventing structure g as described above, the reflection preventing structure g is not limited to the state as illustrated in FIGS. 4(a) to 4(f).

Figure 5:
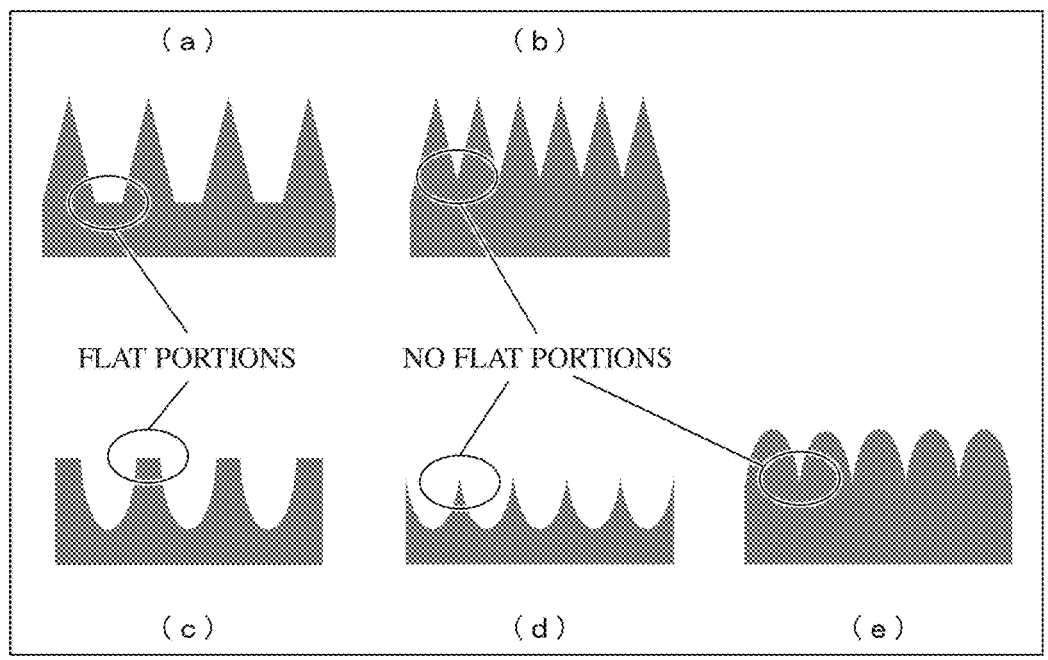
FIG. 5 is a cross-sectional view schematically illustrating other configuration examples of the reflection preventing structure which is formed on the side of the light irradiation surface of the transparent member with respect to the light-emitting element, in which (a) illustrates a configuration example of the reflection preventing structure, (b) illustrates another configuration example of the reflection preventing structure, (c) illustrates still another configuration example of the reflection preventing structure, (d) illustrates still another configuration example of the reflection preventing structure, and (e) illustrates still another example of the reflection preventing structure.

For example, a state where the diameter of each projection PJ is successively reduced as illustrated in FIG. 5 can also be considered. Thus, FIGS. 5(a) to 5(e) illustrate representative examples of the reflection preventing structure g. FIG. 5 is a cross-sectional view schematically illustrating configuration examples of the reflection preventing structure g formed on the side of the light irradiation surface SUF1 of the transparent member 1.

FIG. 5(a) illustrates a configuration example (tapered shapes with flat portions) of the reflection preventing structure g, and FIG. 5(b) illustrates another configuration example (tapered shapes without flat portions) of the reflection preventing structure g.

In addition, FIG. 5(c) illustrates still another configuration example (Konide shapes with flat portions) of the reflection preventing structure g, FIG. 5(d) illustrates still another configuration example (ice pillar shapes without flat portions) of the reflection preventing structure g, and FIG. 5(e) illustrates still another configuration example (bell shapes with no flat portions) of the reflection preventing structure g.

As illustrated in FIG. 5, projections with flat portions provided between projections and projections without flat portions are formed depending on a formation condition of the reflection preventing structure g. In addition, there are various shapes of the projections themselves such as a circular cone shape, a pyramid shape, or a bell shape.

As a shape of the projections PJ, projections PJ is preferably formed so as not to have the flat portions as illustrated in FIGS. 5(b), 5(d), and 5(e). If there are such flat portions, a variation in refractive indexes from the air to a specific substance (such as glass or sapphire) at this portion is not smooth, and irregularity occurs. Accordingly, there is a case where less effects of preventing reflection or reducing reflection can be achieved.

By densely aligning the plurality of projections PJ with the shapes as described above on the light irradiation surface SUF1 at the interval d, the refractive index n of the combination of the air and the reflection preventing structure g smoothly (gently) varies from a refractive index n1 of the air (the position of a coordinate×3) to a refractive index n2 of the transparent member 1 (the position of a coordinate×2) as in the graph illustrated on the right side of FIG. 1, and the reflectance R of the laser light L by the transparent member 1 is significantly reduced. In addition, it is a matter of course that the refractive index n is equal to the refractive index n2 of the transparent member 1 and is a constant value within a range of x2≤x≤x1. In contrast, it is a matter of course that the refractive index n is equal to the refractive index n1 of the air and is a constant value within a range of x≤x3.

In addition, the refractive index n1 of the air can be considered to be substantially the same as a refractive index of vacuum, which is 1. On the other hand, the refractive index n2 in a case of employing sapphire as a constituent material of the transparent member 1 is 1.785.

Generally, a reflectance R (%) of light at a boundary between substances with different refractive indexes n satisfies $$R=[(n1-n2)^2/(n1+n2)^2]\times 100 \qquad (1)$$

where the refractive indexes n of the two substances configuring the boundary are defined as (n1, n2).

Equation (1) represents that the reflectance R decreases at the boundary between substances with a small difference $\Delta n$ (=n1−n2) in the refractive indexes while the reflectance R increases at the boundary between substances with a larger difference $\Delta n$ in the refractive indexes. In other words, it can be said that the reflectance of light varies depending on how different the refractive indexes are by sensing the difference $\Delta n$ in the refractive indexes at the boundary between substances.

If it is considered herein that the light is made to be incident on the transparent member 1 provided with the aforementioned reflection preventing structure g, for example, the laser light L advances without sensing the difference $\Delta n$ in the refractive indexes n since the refractive indexes n sensed by the laser light L smoothly (gradually) varies. In other words, there is no difference $\Delta n$ in the refractive index, that is, reflection does not occur. Accordingly, the laser light L is substantially not reflected by the light irradiation surface SUF1 of the transparent member 1, the efficiency in irradiating the light-emitting section 2 with the laser light L is enhanced.

Similarly, the fluorescent light permeating or passing through the inside of the transparent member 1 comes out from the light irradiation surface SUF1 to the air as if there was no difference $\Delta n$ in the refractive indexes between the transparent member 1 and the air at the boundary thereof, and therefore, efficiency in extracting light from the transparent member 1 to the air increases. That is, efficiency in extracting the fluorescent light from the transparent member 1 to the air is enhanced.

For example, surface reflection of 7.9% occurs at an ordinary flat boundary between sapphire and the air. It is possible to reduce the surface reflection to about 0% by forming the reflection preventing structure g on the light irradiation surface SUF1 of the transparent member 1 composed of sapphire.

Furthermore, the light irradiation surface SUF1 is distant from the surface SUF2 of the light-emitting section 2 on the opposite side by a distance corresponding to the thickness H of the transparent member 1. In other words, a boundary between the air and the transparent member 1, that is, a refractive index surface, which is on the incident side of the laser light L, on which the reflection preventing structure g is formed, which is generally expected to have a large difference between refractive indexes, and a thermal boundary, through which the heat from the light-emitting section 2 as a main heat generation source among the constituents of the light-emitting element is delivered to the transparent member 1, are distant away from each other. In doing so, it is possible to prevent the reflection preventing structure g from being damaged by the heat generated from the light-emitting section 2. Accordingly, it is possible to maintain the aforementioned functions of the light-emitting element 10a according to this embodiment over a long period.

In addition, since sapphire (melting point: 2050° C.), magnesia (melting point: 2850° C.), gallium nitride (melting point: at least 1000° C.), or spinel (melting point: 2130° C.) configuring the transparent member 1 according to this embodiment has a high melting point, it is possible to maintain the initial shape thereof even if the temperature of the light-emitting section 2 increases by irradiation with the laser light L.

Since the surface area of the transparent member 1 substantially increases due to concavities and convexities provided in the reflection preventing structure g, an effect of increasing a heat discharge property for the heat generated by the light-emitting section 2 is achieved by using the transparent member 1 according to this embodiment.

<Light-Emitting Section 2>

(Composition of Light-Emitting Section 2)

Next, the light-emitting section 2 is configured to be irradiated with the laser light L to thereby generate fluorescent light, and includes phosphors which receive the laser light L and generate the fluorescent light. More specifically, the phosphors are dispersed in inorganic glass (n=1.760) with a low melting point as a sealing material, in the light-emitting section 2.

Although a ratio of the inorganic glass and the phosphors is about 10:1, for example, and the ratio is not limited thereto. In addition, the light-emitting section 2 may be obtained by packing the phosphors.

The sealing material is not limited to the inorganic glass according to this embodiment, and so-called organic-inorganic hybrid glass (HBG) or a resin material such as silicone resin may be used.

Next, the difference $\Delta n$ in the refractive indexes of the transparent material 1 and the light-emitting section 2 is preferably equal to or less than 0.35.

If a resin material such as silicone resin is selected as the sealing material, the refractive index n of the light-emitting section 2 is about 1.5 (lower limit). If 100% oxynitride phosphors are used to produce the light-emitting section 2, the refractive index n of the light-emitting section 2 is about 2.0.

On the other hand, the refractive index n in a case of employing sapphire, magnesia, gallium nitride, or spinel as the transparent material 1 is within a range from about 1.5 to about 2.0. Thus, if it is assumed that both the refractive indexes n of the light-emitting section 2 and the transparent material 1 ranges from about 1.5 to 2.0, the reflectance R at the boundary therebetween is 1% when the refractive index n of one of the light-emitting section 2 and the transparent member 1 is 1.5 and the difference Δn in the refractive indexes is 0.35 (that is, the refractive index n of the other one of the light-emitting section 2 and the transparent material 1 is 1.85).

In addition, when the refractive index n of one of the light-emitting section 2 and the transparent member is 2.0 and the difference Δn in the refractive indexes is 0.35 (that is, the refractive index n of the other one of the light-emitting section 2 and the transparent material 1 is 1.65), the reflectance R is 0.92%.

Accordingly, if the difference Δn in the refractive indexes of the transparent member 1 and the light-emitting section 2 is equal to or more than 0.35, it is possible to suppress the reflectance R at the boundary between the transparent member 1 and the light-emitting section 2 to 1% or less.

Next, the refractive index n of the transparent member 1 is preferably equal to or more than 1.65. If it is assumed that the upper limit of the refractive index n of the light-emitting section 2 is 2.0 as described above, it is possible to satisfy the difference Δn in the refractive indexes 0.35 for the light-emitting section 2 with a refractive index n=1.5 to 2.0 when the refractive index n of the transparent member 1 is equal to or more than 1.65.

In addition, the reason that inorganic glass is used as the sealing material of the light-emitting section 2 in this embodiment is because reference is substantially not generated at the boundary between the light-emitting section 2 and the transparent member 1 since the refractive index n (=1.760) of the light-emitting section 2 is significantly close to the refractive index n2 (=1.785) of the transparent member 1 made of sapphire. In addition, the reflectance at the boundary between the sapphire and the inorganic glass is 0.005%, which is approximately 0.

Accordingly, the laser light L reaches the light-emitting section 2 without deviating from a reflectance of about 0% until the laser light L reaches the light-emitting section 2 from the air through the transparent member 1 by combining the transparent member 1 (in a case of configuring the base material 101 by sapphire) with the aforementioned reflection preventing structure g with the light-emitting section 2 (inorganic glass:phosphors=10:1) according to the light-emitting element 10a. Therefore, the efficiency in irradiating the light-emitting section 2 with the laser light L is further enhanced. In addition, the fluorescent light reaches the top portion of the reflection preventing structure g without deviating from the reflectance of about 0% until the fluorescent light reaches the top portion (flat planes including the tip ends of the respective projections PJ) of the reflection preventing structure g from the surface SUF2 of the light-emitting section 2. Accordingly, the efficiency in extracting the fluorescent light permeating through the transparent member 1 from the light-emitting section 2 is further enhanced.

In addition, physical properties of the sapphire used in the transparent member 1 and the inorganic glass used in the light-emitting section 2 according to this embodiment are summarized as the following table.

TABLE 1

| Constituent | Transparent member 1 | Light-emitting section 2 |
| --- | --- | --- |
| Material | Sapphire (Al$_2$O$_3$) | Inorganic glass |
| Thermal Conductivity (W/mK) | 25 (at 100° C.) | 1 |
| Refractive Index | 1.785 | 1.760 |
| Thickness (mm) | 0.2 to 1 | 0.5 to 2.0 |
| Melting point (° C.) | 2050 | <600 |
| Thermal resistance (K/W) | 0.2 | 83.3 |

(Phosphors)

Next, the phosphors contained in the light-emitting section 2 are nitride-based or oxynitride-based phosphors, for example, and one or more phosphors emitting blue, green, and red light are dispersed on the inorganic glass.

In addition, the phosphors are yellow phosphors or mixtures of green phosphors and red phosphors. The yellow phosphors are phosphors which generate fluorescent light with a peak wavelength within a wavelength range of equal to or more than 560 nm and equal to or less than 590 nm, which are YAG (Y—Al-Garnet)-based or oxynitride-based phosphors. The green phosphors are phosphors which generate fluorescent light with a peak wavelength within a wavelength range of equal to or more than 510 nm and equal to or less than 560 nm. The red phosphors are phosphors which generate fluorescent light with a peak wavelength within a wavelength range of equal to or more than 600 nm and equal to or less than 680 nm.

If a semiconductor laser with an oscillation wavelength of 405 nm (violet blue) is used as a semiconductor laser 3 which will be described later, the fluorescent light generated from the light-emitting section 2 becomes white light as a result of mixing of a plurality of colors.

(Types of Phosphors)

Next, the light-emitting section 2 preferably contains nitride-based, oxynitride-based, or garnet-based phosphors, or group-III-V compound semiconductor nanoparticle phosphors. Such materials have high resistance against extremely strong laser light (high output and high light density).

Representative examples of the oxynitride-based phosphors include a phosphor called sialon phosphor. The sialon phosphor is a substance, in which a part of silicon atoms of silicon nitride are substituted with aluminum atoms and a part of nitrogen atoms are substituted with oxygen atoms. It is possible to produce the sialon phosphor by dissolving alumina (Al$_2$O$_3$), quartz (SiO$_2$), a rear-earth element, and the like in silicon nitride (Si$_3$N$_4$).

On the other hand, one of features of the semiconductor nanoparticle phosphors is that it is possible to change a color of emitted light by a quantum size effect by changing the particle size thereof to a nanometer size even if the same compound semiconductor (for example, indium phosphide (InP)) is used. For example, red light is emitted when the particle size is from about 3 nm to 4 nm when InP is used (here, the particle size was evaluated by a transmission electron microscope (TEM)).

In addition, the semiconductor nanoparticle phosphor has a feature that duration of fluorescent light is short since the semiconductor nanoparticle phosphor is on the basis of a semiconductor and a feature that the semiconductor nanoparticle phosphor has high resistance against excitation light with high power and high power concentration since power of the excitation light can be rapidly emitted as fluorescent light. This is because duration of light emission of the semiconductor nanoparticle phosphor is about 10 ns (nanoseconds) which is smaller than that of an ordinary phosphor containing rear earths as light emission centers by five orders of magnitude.

Furthermore, since the duration of light emission is short as described above, it is possible to quickly repeat absorption of the laser light L and light emission of the phosphors. As a result, it is possible to maintain a high effect against strong laser light L and reduce heat generation from the phosphors.

Accordingly, it is possible to further suppress degradation (change in color, deformation, change of properties, and the like) of the light-emitting section 2 due to heat. Accordingly, it is possible to further suppress a decrease in the duration of the light-emitting element 10a when a light-emitting element with high output of excitation light is used as an excitation light source.

(Shape and Size of Light-Emitting Section 2)

Next, the shape and the size of the light-emitting section 2 is a circular cylindrical shape with a diameter of 2.0 mm and a thickness of 1 mm, for example. In addition, the light-emitting section 2 may have a rectangular parallelepiped shape instead of the circular cylindrical shape. For example, the light-emitting section 2 has a rectangular parallelepiped shape with a size of 3 mm×1 mm×1 mm.

The thickness of the light-emitting section 2 required here varies depending on a ratio between the phosphors and the sealing material in the light-emitting section 2. If the content of the phosphors in the light-emitting section 2 increases, efficiency in converting the laser light L into white light increases up to specific content, and therefore, it is possible to reduce the thickness of the light-emitting section 2. Although there is an effect of enhancing the heat discharge effect to the transparent member 1 if the thickness of the light-emitting section 2 is reduced, there is a concern that the laser light L is not converted into the fluorescent light and emitted to the outside if the thickness is excessively thin. Therefore, the thickness of the light-emitting section 2 is preferably at least ten times as the particle size of each phosphor from a viewpoint of absorption of the laser light L by the phosphors. Although it is only necessary that the thickness of the light-emitting section 2 be equal to or more than 0.01 μm in a case of using the nanoparticle phosphors from this viewpoint, the thickness of the light-emitting section 2 is preferably equal to or more than 10 μm, namely equal to or more than 0.01 mm in consideration of ease of manufacturing processes such as dispersion in the sealing material.

Accordingly, the thickness of the light-emitting section 2 using nitride-based or oxynitride-based phosphors is preferably equal to or more than 0.2 mm and equal to or less than 2 mm. However, if the content of the phosphors is excessively large (typically, the content of the phosphors is 100%), the lower limit of the thickness is not limited thereto.

In addition, it is also possible to implement the high-luminance and high-luminous-flux light-emitting section 2 by using a light-emitting section 2 with a square bottom surface, 10 mm on a side, and with a thickness of 0.3 mm and irradiating the light-emitting section 2 with the laser light L with a beam diameter of 1 mm or 2 mm, for example, as the excitation light, as well as the aforementioned arrangement of the sizes and the shape of the light-emitting section 2.

<Semiconductor Laser 3>

The semiconductor laser 3 functions as an excitation light source which generates excitation light. Laser light as the excitation light from the semiconductor laser 3 is oscillated. Although only one semiconductor laser 3 may be used as the excitation light source, a plurality of semiconductor lasers 3 may be used. High-output laser light L can be more easily obtained by using the plurality of semiconductor lasers 3.

Due to the small size of the semiconductor laser 3, it is possible to reduce the size of the light-emitting device itself composed of the semiconductor laser 3 and the light-emitting section 2 by using the semiconductor laser 3 as the excitation light source. In addition, a degree of freedom regarding a range of products, to which the light-emitting device is applied, increases, and a degree of freedom in designing the products employing the light-emitting device increases.

The semiconductor laser 3 includes one light-emission point in one chip, oscillates laser light of 405 nm (violet blue) with an output of 1.0 W at an operation voltage of 5 V at a current 0.6 A, and is sealed in a package with a diameter of 5.6 mm, for example. The laser light oscillated by the semiconductor laser 3 is not limited to 405 nm and may be laser light with a peak wavelength within a wavelength range of equal to or more than 350 nm and equal to or less than 490 nm.

If it is possible to produce a satisfactory semiconductor laser 3 for a short wavelength, which oscillates laser light with a wavelength of less than 350 nm, such a semiconductor laser designed to oscillate the laser light with a wavelength of less than 350 nm can also be used as the semiconductor laser 3 according to this embodiment.

Although the semiconductor laser 3 is used as the excitation light source in this embodiment, the excitation light source may be composed of a laser light source other than the semiconductor laser. For example, the excitation light source may be a gas laser using energy levels of atoms, ion, molecule, and the like of gas, liquid laser using molecule of colorant as organic color molecule dissolved in liquid such as alcohol, a solid laser containing ion causing stimulated discharge in solid crystal, or the like.

It is possible to obtain significantly high-power and significantly high-power-concentration laser light L by using the semiconductor laser 3 or another laser light as described above and to thereby extract high-luminance and high-luminous-flux illumination light from the light-emitting section 2. In addition, since the refractive index boundary, at which the reflection preventing structure g is formed, on the incident side of the laser light L and the thermal boundary, through which heat from the light-emitting section 2 as a main heat generation source among the constituents of the light-emitting element 10a is delivered to the transparent member 1 are separate from each other, the reflection preventing structure g is not damaged.

Although the semiconductor laser 3 is used as the excitation light source in this embodiment, it is also possible to use an LED chip (light emitting diode) instead of the semiconductor laser 3. Due to the small size of the LED chip, it is possible to reduce the size of the light-emitting device itself composed of the LED chip and the light-emitting section 2 by using the LED chip as the excitation light source, a degree of freedom regarding a range of products, to which the light-emitting device is applied, increases, and a degree of freedom in designing products employing the light-emitting device increases. In addition, since the refractive index boundary, at which the reflection preventing structure g is formed, on the incident side of the excitation light and the thermal boundary, through which the heat from the light-emitting section 2 as a main heat generation source among the constituents of the light-emitting elements 10a to 10d is delivered to the transparent member 1, are separate from each other and the heat generated from the excited phosphors escapes to the transparent member 1, it is possible to lower an ambient temperature of the phosphors and to thereby suppress a decrease in deficiency of the light-emitting section 2 due to an increase in the ambient temperature of the phosphor. Accordingly, it is possible to implement a decrease in size of the light-emitting device and low power consumption.

Next, a description will be given of a basic structure of the semiconductor laser 3. FIG. 10(a) schematically illustrates a circuit diagram of the semiconductor laser 3, and FIG. 10(b) is a perspective view illustrating a basic structure of the semiconductor laser 3. As illustrated in the drawings, the semiconductor laser 3 has a configuration, in which a cathode electrode 23, a substrate 22, a clad layer 113, an active layer 111, a clad layer 112, and an anode electrode 21 are laminated in this order.

The substrate 22 is a semiconductor substrate, and it is preferable to use GaN, sapphire, or SiC in order to obtain blue to ultraviolet excitation light for exciting the phosphors as in the present application. As Other typical examples of the substrate for the semiconductor laser, any material among group-IV semiconductors such as Si, Ge, and SiC, group III-V compound semiconductors such as GaAs, GaP, InP, AlAs, GaN, InN, InSb, GaSb, and AlN, group-II-VI compound semiconductors such as ZnTe, ZeSe, ZnS, and ZnO, oxide insulators such as ZnO, $Al_2O_3$, $SiO_2$, $TiO_2$, $CrO_2$, and $CeO_2$, and nitride insulators such as SiN is used.

The anode 21 is for causing current to flow through the active layer 111 via the clad layer 112.

The cathode electrode 23 is for causing the current to flow through the active layer 111 from a lower portion of the substrate 22 via the clad layer 113. In addition, the current is made to flow by applying forward bias to the anode electrode 21 and the cathode electrode 23.

In addition, the active layer 111 has a structure interposed between the clad layer 113 and the clad layer 112.

Moreover, a mixed crystal semiconductor composed of AlInGaN is used as a material of the active layer 111 and the clad layers in order to obtain blue to ultraviolet excitation light. Generally, a mixed semiconductor containing Al, Ga, In, As, P, N, and Sb as main compositions is used for an active layer and clad layers of semiconductor laser, and such a configuration is also applicable. In addition, the semiconductor layer may be composed of a group-II-CI compound semiconductor of Zn, Mg, S, Se, Te, ZnO, and the like.

In addition, the active layer 111 is a region where light emission occurs due to the flowing current, and the emitted light is trapped in the active layer 111 due to a difference between the clad layer 112 and the clad layer 113.

Furthermore, a front-side cleavage surface 114 and a back-side cleavage surface 115 which are provided so as to face each other are formed in the active layer 111 in order to trap light which is amplified by stimulated emission, and the front-side cleavage surface 114 and the back-side cleavage surface 115 function as mirrors.

However, the front-side cleavage surface 114 and the back-side cleavage surface 115 are different from a mirror which fully reflects light, and part of the light amplified by the stimulated emission is emitted from the front-side cleavage surface 114 and the back-side cleavage surface 115 (the front-side cleavage surface 114 in this embodiment for convenience) in the active layer 111 and becomes excitation light L0. In addition, the active layer 111 may be formed so as to have a multilayer quantum well structure.

In addition, a reflection film (not shown) for laser oscillation is formed at the back-side cleavage surface 115 which faces the front-side cleavage surface 114, and it is possible to emit a large part of excitation light L0 from the front-side cleavage surface 114, for example, which is a low-reflectance end surface, by providing a difference in the reflectances of the front-side cleavage surface 114 and the back-side cleavage surface 115 from a light-emission point 116.

The clad layer 113 and the clad layer 112 may be composed of any semiconductor among group-III-V compound semiconductors such as n type and p type GaAs, GaP, InP, AlAs, GaN, InN, InSb, GaSb, and AlN and group-II-VI compound semiconductors such as ZnTe, ZeSe, ZnS, and ZnO, and is configured such that current can be made to flow into the active layer 111 by applying forward bias to the anode electrode 21 and the cathode electrode 23.

In relation to film formation of the respective semiconductor layers such as the clad layer 113, the clad layer 112, and the active layer 111, it is possible to use a general film formation method such as a MOCVD (Metalorganic Chemical Vapor Deposition) method, a MBE (Molecular Beam Epotaxy) method, a CVD (Chemical Vapor Deposition) method, a laser ablation method, or a sputtering method. In relation to film formation of the respective metal layers, it is possible to use a general film formation method such as a vacuum deposition method, a plating method, a laser ablation method, or a sputtering method.

[2. Configuration of Reflective-Type Light-Emitting Device 20]

Figure 6:
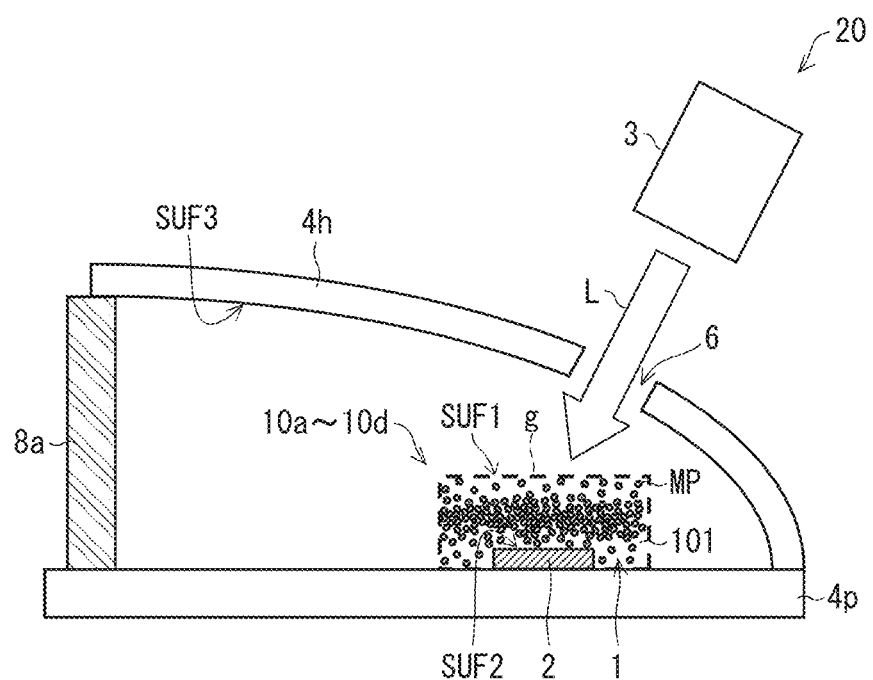
FIG. 6 is a cross-sectional view schematically illustrating a configuration of a light-emitting device (reflective type) according to another embodiment of the present invention.

Next, a description will be given of a reflective-type light-emitting device 20 according to another embodiment of the prevent invention based on FIG. 6. FIG. 6 is a cross-sectional view schematically illustrating a configuration of the reflective-type light-emitting device 20.

As illustrated in FIG. 6, the reflective-type light-emitting device 20 is provided with the aforementioned transparent member 1, the aforementioned light-emitting section 2, the aforementioned semiconductor laser 3, a half-parabola-type reflecting mirror 4h, a thermal conductive member 4p, and a laser cut filter 8a.

In addition, since configurations other than the configurations described in this embodiment are the same as those in the above description, a description will be given only of the half-parabola-type reflecting mirror 4h, the thermal conductive member (reflecting member) 4p, and the laser cut filter 8a.

<Half-Parabola-Type Reflecting Mirror 4h>

The half-parabola-type reflecting mirror 4h has a shape obtained by cutting a parabola-type reflecting mirror (see a parabola-type reflecting mirror 4 described later, for example) to a half at a plane including an optical axis (rotation axis). In addition, the light-emitting section 2 is preferably arranged in the vicinity of a focal point of the half-parabola-type reflecting mirror 4h.

<Window Section 6>

Next, the semiconductor laser 3 is arranged outside the half-parabola-type reflecting mirror 4h, and a window section 6, through which the laser light L is made to permeate or pass, is formed at the half-parabola-type reflecting mirror 4h. The window section 6 may be an opening or a component including a transparent member capable of allowing the laser light L to permeate therethrough. For example, a transparent plate provided with a filter, through which the laser light L permeates, which reflects white light (the fluorescent light from the light-emitting section 2), may be provided as the window section 6. With such a configuration, it is possible to prevent the fluorescent light from the light-emitting section 2 from leaking through the window section 6 and to thereby enhance efficiency in using the fluorescent light.

With the above configuration, it is possible to irradiate the light-emitting section 2 with the laser light from the outside of the half-parabola-type reflecting mirror 4h through the window section 6. Accordingly, it is possible to enhance a degree of freedom in arranging the semiconductor laser 3 and to thereby facilitate setting of an angle, at which the light irradiation surface of the light-emitting section 2 is irradiated with the laser light L, to a preferable angle, for example.

In addition, although the half-parabola-type reflecting mirror 4h according to this embodiment has a half-parabola shape which is a partially curved surface obtained by cutting a parabola by a plane including a rotation axis, as an example of the shape of the reflecting mirror, the shape of the reflecting mirror is not limited thereto.

For example, the shape of the reflecting mirror may be a parabola shape, a partially curved surface of a part of an ellipsoid of revolution, or a hemisphere. That is, any shape of the reflecting mirror is applicable as long as the shape includes, in the reflecting surface thereof, at least a part of a curved surface formed by rotating a figure (an ellipse, a circle, or a parabola) about the rotation axis.

<Thermal Conductive Member 4p>

As illustrated in FIG. 6, the light-emitting section 2 is bonded to the upper portion of the thermal conductive member 4p. In doing so, an effect of cooling the light-emitting section 2 is enhanced by surrounding the periphery of the light-emitting section 2 by the transparent member 1 and the thermal conductive member 4p.

In addition, the light-emitting section 2 is thermally bonded to the thermal conductive member 4p. As a material and a method for the bonding, the light-emitting section 2 may be bonded by using thermal conductive grease, for example, or the light-emitting section 2 may be bonded by using a feature that inorganic glass is fused to metal when the light-emitting section 2, in which the phosphors are dispersed in inorganic glass as a dispersion medium, is produced.

Next, although any constituent material of the thermal conductive member 4p is applicable as long as the material has thermal conductivity for diffusing the heat generated from the light-emitting section 2, metal or ceramics is preferably used. Since metal has high thermal conductivity, a heat releasing effect of the thermal conductive member 4p can be expected.

Next, the laser light L permeating through the inside of the light-emitting section 2 is reflected at a boundary between the thermal conductive member 4p and the light-emitting section 2. In so doing, the laser light L permeating through the inside of the light-emitting section 2 is reflected at the boundary, and therefore, an optical path length of the laser light L permeating through the inside of the light-emitting section 2 is doubled. Accordingly, it is possible to achieve sufficient light-emitting efficiency even if the density of the phosphors contained in the light-emitting section 2 is fixed and the thickness of the light-emitting section 2 in the irradiation direction of the laser light L is reduced to ½.

<Laser Cut Filter 8a>

Next, the laser cut filter 8a is provided at an opening of a light reflecting concave surface SUF3 of the half-parabola-type reflecting mirror 4h and tightly seals the reflective-type light-emitting device 20. The fluorescent light generated from the light-emitting section 2 or the fluorescent light reflected by the half-parabola-type reflecting mirror 4h is emitted to a front side of the reflective-type light-emitting device 20 through the laser cut filter 8a.

The laser cut filter 8a is applicable as long as the laser cut filter 8a has at least permeability of allowing the fluorescent light generated from the light-emitting section 2 or the fluorescent light reflected by the light reflecting concave surface SUF3 to permeate therethrough.

In addition, the laser cut filter 8a is formed of a material which blocks light with the wavelength of the laser light L from the semiconductor laser 3 and allows the fluorescent light generated from the light-emitting section 2 or the fluorescent light reflected by the light reflecting concave surface SUF3 to permeate therethrough.

Most part of the coherent laser light L permeating through the light-emitting section 2 is converted into incoherent fluorescent light. However, a case where part of the laser light L is not converted for some reasons is also considered. Even in such a case, it is possible to prevent the laser light L from leaking to the outside by blocking the light with the wavelength of the laser light L by the laser cut filter 8a.

In addition, the laser cut filter 8a is not necessarily provided and may be provided as necessary in a system which generates pseudo white light by mixing excitation light from an excitation light source and fluorescent light generated from the light-emitting section 2.

[3. Configuration of Transparent-Type Light-Emitting Device 30]

Figure 7:
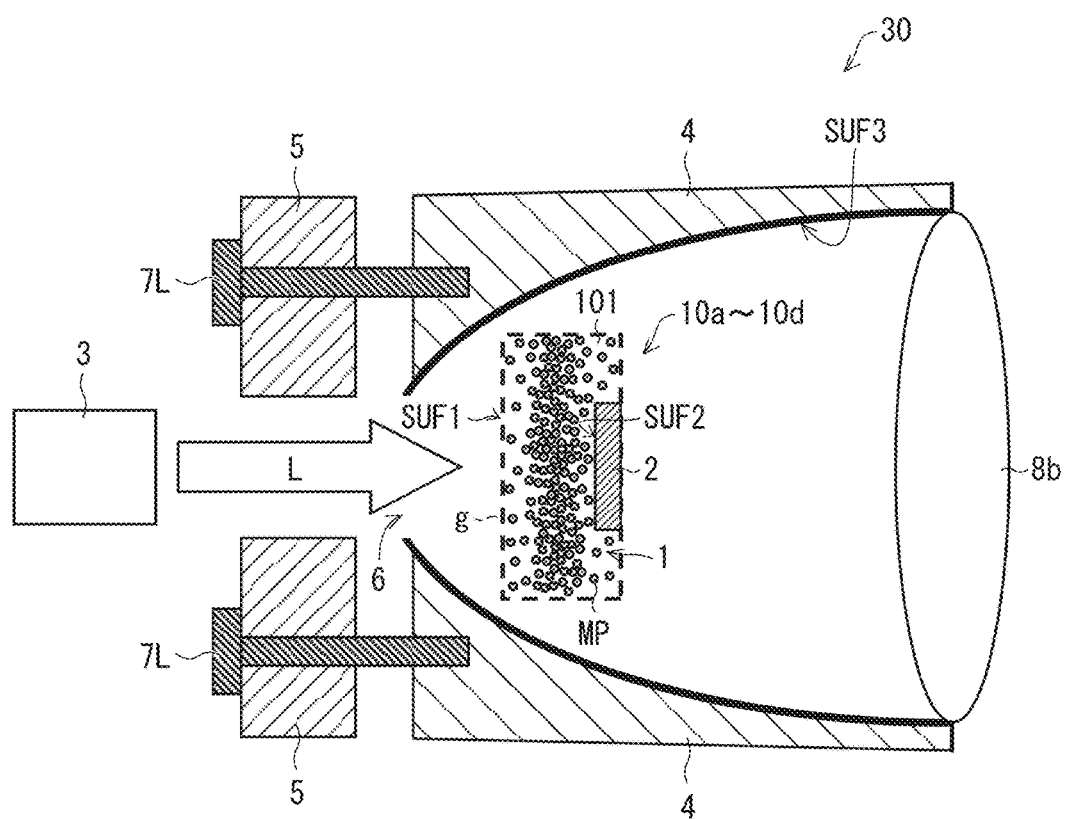
FIG. 7 is a cross-sectional view schematically illustrating a configuration of a light-emitting device (transmissive type) according to still another embodiment of the present invention.

Next, a description will be given of a transparent-type light-emitting device (light-emitting device) 30 according to still another embodiment of the present invention with reference to FIG. 7. FIG. 7 is a cross-sectional view schematically illustrating a configuration of the transparent-type light-emitting device 30.

As illustrated in FIG. 7, the transparent-type light-emitting device 30 is provided with the aforementioned transparent member 1, the light-emitting section 2, the semiconductor laser 3, a parabola-type reflecting mirror (reflecting mirror) 4, a substrate 5, screws 7L and 7R, and an optical member 8b. In addition, since the transparent member 1, the light-emitting section 2, and the semiconductor laser 3 are the same as those in the above description, the description thereof will be omitted here. Although FIG. 7 is a diagram, in which the light-emitting elements 10a to 10d are floating in the air, the light-emitting elements 10a to 10d are fixed to the parabola-type reflecting mirror 4 by support members made of metal (or made of transparent resin), which is not shown in the drawing, in this embodiment.

<Parabola-Type Reflecting Mirror 4>

The parabola-type reflecting mirror 4 includes a light reflecting concave surface SUF3 which reflects the fluorescent light generated from the light-emitting section 2 and forms a beam flux which advances within a certain solid angle by reflecting the fluorescent light generated from the light-emitting section 2 by the light reflecting concave surface SUF3.

Since a so-called rotating paraboloid is employed as a shape of the light reflecting concave surface SUF3 in this embodiment, the cross-sectional shape taken along a plane including the optical axis (rotation axis) is a parabolic shape (parabola) as illustrated in FIG. 3.

In addition, a window section 6 which will be described later is formed at the bottom of the rotating paraboloid at the light reflecting concave surface SUF3, and the light-emitting section 2 is arranged in the vicinity of the focal point of the parabola-type reflecting mirror 4.

Although any material can be used as the material of the parabola-type reflecting mirror 4, it is preferable to perform silver plating and chromate coating after producing a reflecting mirror by copper or SUS (Stainless Steel) in consideration of a reflectance. In addition, the parabola-type reflecting mirror 4 may be produced by using aluminum and an antioxidizing film may be applied to the surface thereof, or a metal thin film may be formed on the surface of a main body of the parabola-type reflecting mirror 4 made of resin.

<Substrate 5>

Next, the substrate 5 is a plate-shaped member with an opening, through which the laser light L emitted from the semiconductor laser 3 is made to pass, and the parabola-type reflecting mirror 4 is fixed to the substrate 5 by the screws 7L and 7R. The light-emitting section 2 is arranged in the vicinity of the focal point of the parabola-type reflecting mirror 4, and the center of the opening substantially coincides with the focal point. Accordingly, the laser light L generated from the semiconductor laser 3 passes through the opening of the substrate 5, is incident on the light irradiation surface SUF1, in which the reflection preventing structure g of the transparent member 1 is formed, permeates through the inside of the transparent member 1, and reaches the light-emitting section 2.

In doing so, the laser light L permeates through the inside of the light-emitting section 2, and the permeating light is scattered by the phosphor particles contained in the light-emitting section 2. Therefore, the permeating light is diffused inside the parabola-type reflecting mirror 4.

Although any material can be used as a material of the substrate 5, it is possible to use metal such as iron or copper with high thermal conductivity. In addition, the substrate 5 and the parabola-type reflecting mirror 4 are fixed to each other by the screws 7L and 7R.

<Window Sections 6>

Next, the semiconductor laser 3 is arranged outside the parabola-type reflecting mirror 4, and the window section 6 which allows the laser light to permeate or pass therethrough is formed at the bottom of the parabola-type reflecting mirror 4. The window section 6 is the same as that in the above description.

<Optical Member 8b>

Next, the optical member 8b is provided at an opening in the light reflecting concave surface SUF3 of the parabola-type reflecting mirror 4 and tightly seals the transparent-type light-emitting device 30. The fluorescent light generated by the light-emitting section 2 or the fluorescent light reflected by the parabola-type reflecting mirror 4 is emitted toward the front side of the transparent-type light-emitting device 30 through the optical member 8b.

Although the optical member 8b has a convex lens shape and a lens function in this embodiment, the optical member 8b may have a concave lens shape instead of the convex lens shape. In addition, the optical member 8b does not necessarily have a structure with the lens function and may have at least transparency for allowing the fluorescent light generated from the light-emitting section 2 or the fluorescent light reflected by the light reflecting concave surface SUF3 to penetrate therethrough.

In addition, although any material may be used as a material of the optical member 8b as long as the material has at least transparency, it is preferable to use a material with high thermal conductivity (20 W/mK or more) in the same manner as the transparent member 1. For example, the optical member 8b preferably contains sapphire, gallium nitride, magnesia, or diamond. In such a case, the optical member 8b has higher thermal conductivity compared to the light-emitting section 2 and can cool the light-emitting section 2 by efficiently absorbing the heat generated at the light-emitting section 2.

The thickness of the optical member 8b is preferably equal to or less than about 3.0 mm. If the thickness is equal to or more than 3.0 mm, absorption of the laser light L is not ignorable, and a cost of the member increases.

In addition, the optical member 8b may be formed of a material which blocks the laser light L from the semiconductor laser 3 and allow the fluorescent light generated from the light-emitting section 2 or the fluorescent light reflected by the light reflecting concave surface SUF3 to permeate therethrough.

Most part of the coherent laser light L permeating through the light-emitting section 2 is converted into incoherent fluorescent light. However, a case where part of the laser light L is not converted for some reasons is also considered. Even in such a case, it is possible to prevent the laser light L from leaking to the outside by blocking the laser light L by the optical member 8b.

[4. Method for Producing Light-Emitting Elements 10a to 10d]

Figure 9:
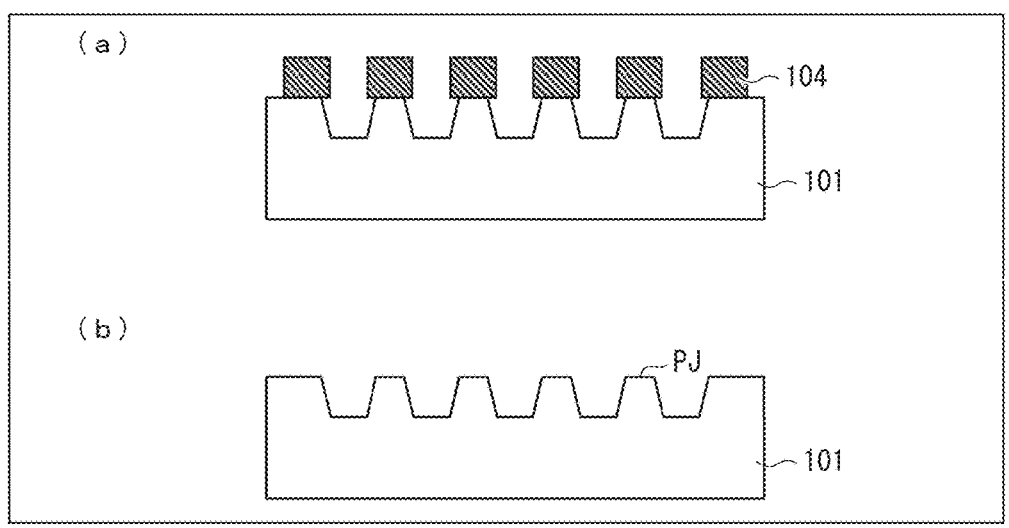
FIG. 9 is a process diagram illustrating a process for forming the concave and convex structure on the transparent member, in which (a) illustrates a state where etching is performed on the transparent member with only the exposed portion left (etching process), and (b) illustrates a state of the transparent member after completion of the etching process.
Figure 10:
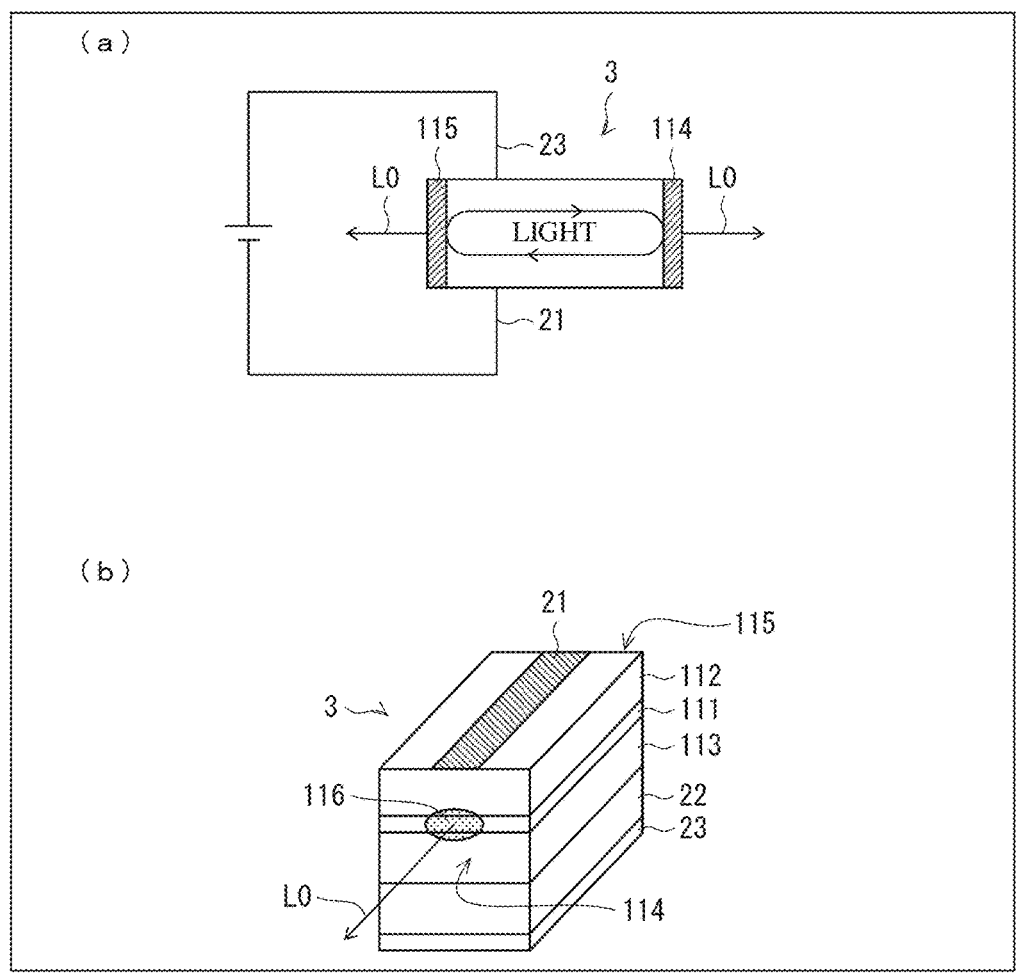
FIG. 10 is a diagram illustrating a basic structure of a semiconductor laser, in which (a) schematically illustrates a circuit diagram of the semiconductor laser, and (b) is a perspective view illustrating the basic structure of the semiconductor laser.

Next, a description will be given of a method for producing the light-emitting elements 10a to 10d based on FIGS. 8 and 9. As a method for forming the reflection preventing structure g on the light irradiation surface SUF1 of the transparent member 1, a general microfabrication technique can be used. Here, it is assumed that the plurality of scattering microregions MP are formed in advance in the base material 101 by the aforementioned method (transparent member formation process).

Here, a method of directly forming the reflection preventing structure g on glass by embossing can be considered as a method of forming the reflection preventing structure g in a case where the sealant of the light-emitting section 2 is glass. However, such a method has the following problems.

In a case of forming the reflection preventing structure g by embossing glass containing phosphors mixed therein, for example, a method of heating the glass up to a softening point of the glass and then pressing a mold with a concave and convex structure of the order of nanometer onto the glass is used.

However, if such a method is used for a glass material, in which phosphors are dispersed, gaps of the mold for forming the reflection preventing structure g on the glass is clogged with the phosphors, and a uniform structure cannot be formed (in addition, a cycle of the concavities and convexities of the mold is several hundred nm, and the height is also several hundred nm; on the other hand, the oxynitride phosphors with a particle size from at least about 5 μm to about 10 μm are used).

On the other hand, since the particle size of the scattering fine particles in the transparent member 1 is generally much smaller than the particle size of the phosphors, the above problem that the gaps of the mold is clogged with the scattering fine particles and uniform structure cannot be formed hardly occurs even if the reflection preventing structure g is formed on the surface of the transparent member 1 by the embossing.

In a case of directly forming the reflection preventing structure g on the surface of the light-emitting section 2 by the embossing, there is a problem that the duration of life of the mold is shortened due to high hardness of the phosphors, or a problem that a high cost is required for the mold since it is necessary to use a mold made of a harder material than the phosphors.

However, since the particle size of the scattering fine particles in the transparent member 1 is much smaller than the particle size of the phosphors as described above, the problem that the duration of life of the mold is shortened and the problem that a high cost is required for the mold hardly occur.

Next, although a method of forming an organic thin film at a part, at which reflection at the surface of the light-emitting section 2 is desired to be prevented, and forming the reflection preventing structure g at the part can also be considered as a method of forming the reflection preventing structure g, the method has the following problems.

For example, since concavities and convexities of the order of micrometer are generally present on the surface of the light-emitting section 2, it is not possible to form a film with a uniform film thickness of the order of nanometer. Accordingly, there is a problem that it is not possible to form the on-target reflection preventing structure g of the order of nanometer and to obtain a desired reflection preventing function.

On the other hand, since surface roughness of the surface of the base material 101 of the transparent member 1 can be reduced as much as possible, it is possible to form a film with a uniform film thickness of the order of nanometer, to form the on-target reflection preventing structure g of the order of nanometer, and to thereby obtain the desired reflection preventing function.

Next, a method of directly attaching a resin film with the reflection preventing structure g integrally formed therewith to the light-emitting section 2 can also be considered as a method of forming the reflection preventing structure g, this method has the following problems.

For example, there is a high possibility that the resin film melts due to the heat generated of the light-emitting section 2, and at least, there is a high possibility that the shape of the reflection preventing structure g cannot be maintained over a long period.

However, in a case of providing the reflection preventing structure g in the transparent member 1, the resin film with the reflection preventing structure g integrally formed therewith, for example, may be provided at a position distant away from the light-emitting section 2 of the transparent member 1, and therefore, the above problem that the shape of the reflection preventing structure g cannot be maintained over a long period hardly occurs.

In addition, a difference in refractive indexes at a boundary between the transparent member 1 and the ambient air (air) is generally larger than the difference in the refractive indexes at the boundary between the light-emitting section 2 and the transparent member 1. Accordingly, it can be considered that it is highly necessary to prevent the light reflection at the boundary between the transparent member 1 and the ambient air (air).

In consideration of the above points, the reflection preventing structure g is formed on the surface of the transparent member 1 in each of the light-emitting elements 10a to 10d.

In addition, it is preferable to use a method of a combination of lithography using light, an X ray, or an electron beam and etching such as dry etching or wet etching as a method of forming the reflection preventing structure g on the side of the light irradiation surface SUF1 of the transparent member 1.

Hereinafter, a description will be given of a method using dry etching as an example of etching. In addition, the dry etching is not limited to the method described below, and it is possible to exemplify plasma etching, RIE (Reactive Ion Etching), ECR plasma (Electron Cyclotron Resonance plasma), helicon-wave excited plasma, and the like.

Next, a description will be given of a method for forming the reflection preventing structure g on the light irradiation surface SUF1 of the transparent member 1 by using dry etching with reference to FIGS. 8 and 9 (concave and convex structure formation process).

The method for producing the light-emitting elements 10a to 10d includes the following processes (1) to (6).

(1) The base material 101 (FIG. 8(a)) with a thickness of 0.5 mm is prepared, and the resist layer 102 is formed on the surface thereof (FIG. 8(b)).

(2) Organic material is used for the resist layer 102, and the resist layer 102 is formed by a spin coat method.

(3) A mask 103, on which a pattern with a desired shape is formed, is used to expose the resist layer to ultraviolet rays and form a desired pattern on the resist layer 102 (FIG. 8(b) to FIG. 8(c)). In addition, a part of a mask opening OP is a part with higher ultraviolet transmittance compared to the other parts.

(4) The resist layer 102 is developed by using predetermined developer. In doing so, the resist layer 102 which is not exposed to the ultraviolet rays remains as a remaining portion 104 on the base material 101 (FIG. 8(d)).

(5) Next, dry etching is performed. As gas used in the dry etching, chlorine-based gas such as $SiCl_4$ is used (FIGS. 8(d) to 9(a)).

(6) Finally, the resist layer 102 is removed by dissociation solution, and a reflection preventing structure provided with a plurality of projections PJ is obtained (FIG. 9(b)).

Moreover, since the reflection preventing structure with a complicated shape is formed, a layer made of an inorganic material and a layer made of a metal material may be combined in addition to the resist layer 102. In doing so, it is possible to control the cross-sectional shape of the base material 101.

Next, the method for producing the light-emitting elements 10a to 10d further include a light-emitting section arrangement process, in which a fitting hole for fitting the light-emitting element 2 thereinto is provided on a side opposite to the light irradiation surface SUF1 (one surface) of the base material 101 and the light-emitting section 2 is fitted into the fitting hole. At this time, a side wall of the fitting hole and the light-emitting section 2 are bonded by the aforementioned adhesive agent.

By the above method, it is possible to produce the light-emitting elements 10a to 10d capable of enhancing light-emitting efficiency of the light-emitting section 2 and maintaining the high light-emitting efficiency over a long period.

[5. Configuration of Laser Downlight 200]

Next, still another embodiment of the present invention will be described as follows with reference to FIGS. 11 to 15. In addition, the same reference numerals will be assigned to the same members as those in the first embodiment, and the descriptions thereof will be omitted.

Here, a description will be given of a laser downlight 200 as an example of the illumination device according to the present invention. The laser downlight 200 is an illumination device installed on a ceiling of a structural object such as a house or a vehicle and uses, as illumination light, fluorescent light generated by irradiating the light-emitting section 2 with the laser light emitted from the semiconductor laser 3.

In addition, an illumination device with the same configuration as that of the laser downlight 200 may be installed on a side wall or a floor of the structural object, and the installation site of the illumination device is not particularly limited.

Figure 11:
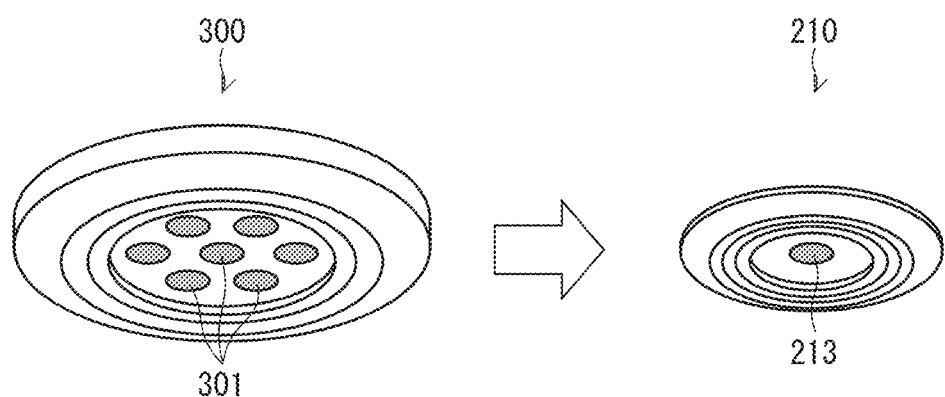
FIG. 11 is an outline diagram illustrating appearances of a light-emitting unit provided in a laser downlight according to an embodiment of the present invention and an LED downlight of the related art.
Figure 12:
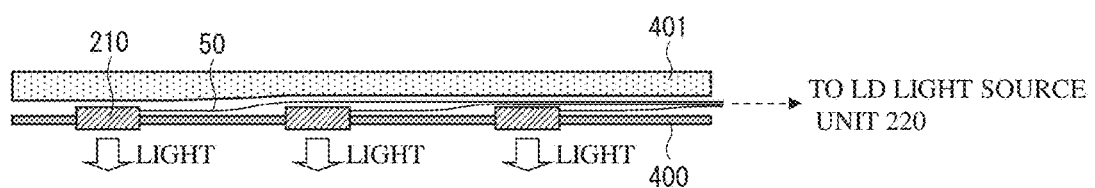
FIG. 12 is a cross-sectional view of a ceiling, on which the laser downlight is installed.
Figure 13:
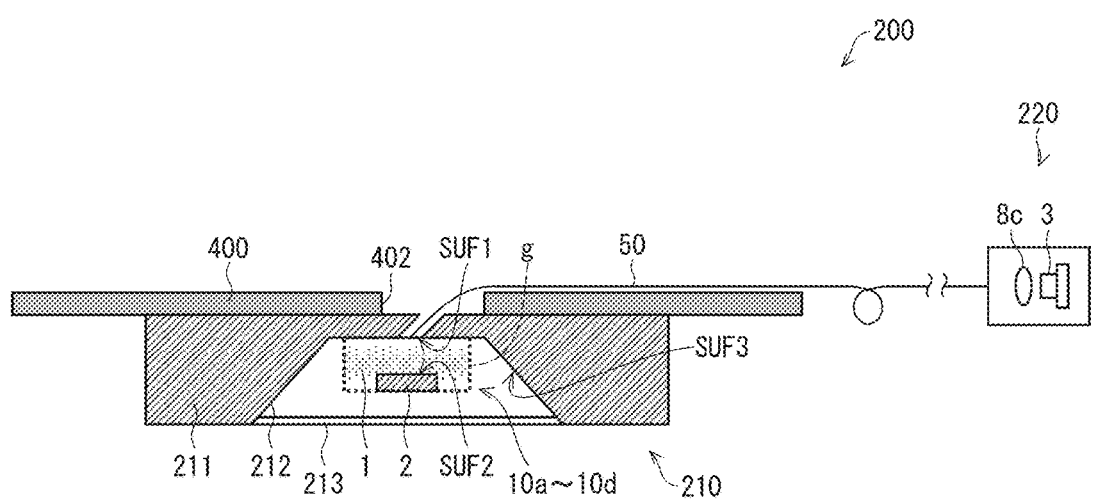
FIG. 13 is a cross-sectional view of the laser downlight.

FIG. 11 is an outline diagram illustrating an appearance of a light-emitting unit 210 and an appearance of an LED downlight 300 of the related art. FIG. 12 is a cross-sectional view of a ceiling on which the laser downlight 200 is installed. FIG. 13 is a cross-sectional view of the laser downlight 200. As illustrated in FIGS. 12 and 13, the laser downlight 200 is embedded in the ceiling 400 and includes the light-emitting unit 210 which emits illumination light and an LD light source unit 220 which supplies laser light to the light-emitting unit 210 via an optical fiber 50. The LD light source unit 220 is not installed on the ceiling, and installed at a position (a side wall of a house, for example), at which the user can easily touch the LD light source unit 220. The position of the LD light source unit 220 can be freely determined as described above because the LD light source unit 220 and the light-emitting unit 210 are connected by the optical fiber 50. The optical fiber 50 is arranged in a gap between a ceiling 400 and a heat insulating material 401.

(Configuration of Light-Emitting Unit 210)

The light-emitting unit 210 is provided with a case body 211, the optical fiber 50, the aforementioned light-emitting elements 10a to 10d, and a transparent plate 213 as illustrated in FIG. 13.

A concave portion 212 is formed in the case body 211, and the light-emitting elements 10a to 10d are arranged on the bottom surface of the concave portion 212. A metal thin film is formed on the surface of the concave portion 212, and the concave portion 212 functions as a reflecting mirror with the light reflection concave surface SUF3.

In addition, a path for the optical fiber 50 is formed above the light-emitting elements 10a to 10d in the case body 211, and the optical fiber 50 extends to the light-emitting elements 10a to 10d through the path. Laser light emitted from an emitting end of the optical fiber 50 permeates through the transparent member 1 and reaches the light-emitting element 2 of each of the light-emitting elements 10a to 10d.

The transparent plate 213 is a transparent or translucent plate arranged so as to block the opening of the concave portion 212. The transparent plate 213 has the same function as that of the aforementioned laser cut filter 8a, and the fluorescent light of the light-emitting section 2 is emitted as illumination light through the transparent plate 213. The transparent plate 213 may be detachable from the case body 211 or may be omitted.

Although the light-emitting unit 210 has a circular outer edge in FIG. 11, the shape of the light-emitting unit 210 (more strictly, the shape of the case body 211) is not particularly limited.

In addition, an ideal point light source is not required for the downlight unlike a case of a headlamp and is sufficiently used in a level, in which the number of light-emission points is one. Accordingly, the shape, the size, and the arrangement of the light-emitting section 2 are less restricted compared to the case of the headlamp.

(Configuration of LD Light Source Unit 220)

The LD light source unit 220 is provided with the semiconductor laser 3, an aspheric lens 8c, and the optical fiber 50.

An incident end as the other end of the optical fiber 50 is connected to the LD light source unit 220, and laser light oscillated by the semiconductor laser 3 is incident on the incident end of the optical fiber 50 via the aspheric lens 8c.

Although only a pair of the semiconductor laser 3 and the aspheric lens 8c is shown in the LD light source unit 220 illustrated in FIG. 13, a flux of optical fibers 50 respectively extending from the light-emitting unit 210 may be guided to a single LD light source unit 220 if a plurality of light-emitting unit 210 are present. In such a case, a pair of the plurality of semiconductor lasers 3 and the aspheric lens 8c is accommodated in a single LD light source unit 220, and the LD light source unit 220 functions as a central power source box.

(Comparison between Laser Downlight 200 and LED Downlight 300 of the Related Art)

The LED downlight 300 of the related art includes a plurality of transparent plates 301 as illustrated in FIG. 11, and illumination light is respectively emitted from the respective transparent plates 301. That is, a plurality of light-emission points are present in the LED downlight 300. The plurality of light-emission points are present in the LED downlight 300 because it is not possible to obtain sufficient light flux as illumination light even if the plurality of light-emission points are not provided since the light flux of the light emitted from the individual light-emission points is relatively small.

On the other hand, the number of light-emission point in the laser downlight 200 may be one since the laser downlight 200 is a high-luminous-flux illumination device. Accordingly, an effect that shading caused by the illumination light clearly appears can be achieved. In addition, it is possible to enhance a color rendering property of the illumination light by configuring the phosphors of the light-emitting section 2 as high-color-rendering phosphors (a combination of several kinds of oxynitride phosphors and/or nitride phosphors, for example).

In doing so, it is possible to implement a high color rendering property which is close to that of an incandescent downlight. For example, it is possible to implement a high rendering property, which cannot be easily implemented by an LED downlight or a fluorescent downlight, such as a performance that an average color rendering evaluation value Ra is equal to or more than 90 and further a specific color rendering evaluation value R9 is equal to or more than 95, by the combination of the high-light-rendering phosphors and the semiconductor laser 3.

Figure 14:
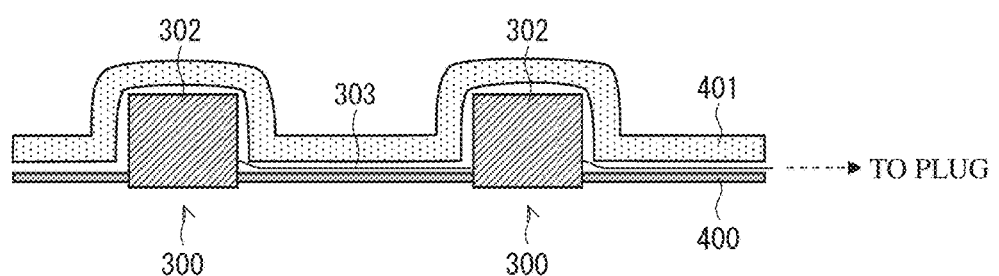
FIG. 14 is a cross-sectional view of a ceiling, on which the LED downlight is installed.

FIG. 14 is a cross-sectional view of a ceiling on which the LED downlight 300 is installed. As illustrated in the drawing, a case body 302 which accommodates an LED chip, a power source, and a cooling unit is embedded in a top panel 400 in the LED downlight 300. The case body 302 is relatively large, and a concave portion along the shape of the case body 302 is formed in the heat insulating material 401 at a part where the case body 302 is arranged. A power source line 303 extends from the case body 302, and the power source line 303 is connected to a plug (not shown).

Such a configuration causes the following problems. First, since the light source (LED chip) and the power source as heat generation sources are present between the top panel 400 and the heat insulating material 401, a problem that the temperature of the ceiling increases and efficiency in cooling a room deteriorates occurs due to usage of the LED downlight 300.

In addition, the power source and the cooling unit are required for each light source in the LED downlight 300, and there is a problem of an increase in the total cost.

In addition, since the case body 302 is relatively large, there is a problem that it is difficult to arrange the LED downlight 300 in the gap between the top panel 400 and the heat insulating material 401 in many cases.

On the other hand, since a large heat generation source is not included in the light-emitting unit 210 in the laser downlight 200, the efficiency in cooling a room does not deteriorate. As a result, it is possible to avoid an increase in the cost of cooling the room.

In addition, since it is not necessary to provide the power source and the cooling unit for each light-emitting unit 210, it is possible to reduce the size and the thickness of the laser downlight 200. As a result, a space for installing the laser downlight 200 is less restricted, which facilitates installation in an existing house.

In addition, the size and the thickness of the laser downlight 200 are reduced, it is possible to install the light-emitting unit 210 on the surface of the top panel 400 as described above, reduce restriction relating installation as compared to the LED downlight 300, and significantly reduce construction costs.

FIG. 15 is a diagram for comparing specifications of the laser downlight 200 and the LED downlight 300. As illustrated in the drawing, volume of the laser light 200 decreases by 94% and mass of the laser light 200 decreases by 86% as compared with those of the LED downlight 300 according to an example.

In addition, since the LD light source unit 220 can be installed at a location that a user hand can easily reach, it is possible to quickly replace the semiconductor laser 3 when the semiconductor laser 3 is out of order. In addition, since the optical fiber 50 extending from the plurality of light-emitting unit 210 is guided to a single LD light source unit 220, it is possible to collectively manage a plurality of semiconductor lasers 3. Accordingly, if the plurality of semiconductor lasers 3 are to be replaced, it is possible to easily replace the plurality of semiconductor lasers.

In addition, while a light flux of about 500 lm can be emitted at power consumption of 10 W in a case of a type of the LED downlight 300 using the high-color-rendering phosphors, optical output of 3.3 W is required in order to implement light with the same brightness by the laser downlight 200. Since the optical output corresponds to power consumption of 10 W if LD efficiency is 35%, and the consumed power of the LED downlight 300 is also 10 W, no significant difference is observed in the power consumption of both the LED downlight 300 and the laser downlight 200. Accordingly, the aforementioned various advantages can be achieved by the laser downlight 200 with the same power consumption as that of the LED downlight 300.

As described above, the laser downlight 200 includes the LD light source unit 220 provided with at least one semiconductor laser 3 for emitting laser light, at least one light-emitting unit 210 provided with the light-emitting section 2 and the concave portion 212 as a reflecting mirror, and the optical fiber 50 for guiding the laser light to each light-emitting unit 210.

The present invention can be expressed as follows.

That is, the laser illumination light source (light-emitting device) according to the present invention is provided with a reflection preventing structure on the surface of the transparent member and may be provided with a structure (diffusing structure) for increasing the size of the light-emission point which is irradiated with the laser light and emits fluorescent light, inside the light-emitting device.

In addition, the light-emitting device according to the present invention may be a reflective-type light-emitting device which emits illumination light in a direction, in which excitation light as laser light is made to be incident on the light-emitting section.

<Points of Diffusing Structure>

The diffusing structure has the following plurality of points.

(1) There is an effect of sufficiently increasing the light-emission point size of the laser light source as the excitation light source.

(2) There is an effect of cancelling local irregularity in intensity distribution of the excitation light, if any, when the light-emitting section is excited, that is, there is an effect of exciting the light-emitting section as mild as possible.

(3) If the light-emitting section is not uniformly excited by the illumination light emitted from the light-emitting section (fluorescent light or light with a color obtained by mixing colors of fluorescent light and excitation light), or the phosphors are not uniformly dispersed in the light-emitting section and the light-emitting section does not uniformly emit light even when uniformly excited, the fluorescent light is diffused (or scattered) while passing through the diffusing structure and can be emitted as uniform illumination light to the outside.

(4) The light source size (light-emission point size) of the excitation light (laser light) emitted from the light-emitting section is enlarged while the excitation light is scattered (or diffused), and illumination light which is safe for eyes can be obtained.

(5) It is possible to appropriately control the scattering (or diffusion) so as not to cause a situation that the excitation light is completely scattered (or diffused) before the excitation light reaches the light-emitting section and is not excited.

As described above, it is necessary that the thickness of the diffusing structure be sufficiently thick (since it can be considered that the diffusion or the scattering isotropically occurs) in order to increase the light-emission point size, and that the diffusing structure have a thickness which is equal to or more than the light-emission point size required from a viewpoint of eye safety.

In addition, the density distribution of the scattering microregions (for example, scattering materials or diffusing materials) causing scattering (or diffusion) in the transparent member may not be uniform and may increase on the close side to the light-emitting section.

According to the transparent member with the diffusing structure in the form of covering the light-emitting section, a collateral effect that it is possible to quickly discharge the heat generated by the light-emitting section is achieved if the thermal conductivity of the transparent member is high. Although a significant effect cannot be expected if the diffusing structure is produced by an organic material-based (resin-based) material, the aforementioned effect can be expected in a case of an inorganic material due to relatively high thermal conductivity.

Even if contrasting (flicker) occurs in the illumination light emitted from the light-emitting section, it is possible to reduce or prevent occurrence of the flicker by using the diffusing structure. If the diffusing structure is not provided, the excitation light is emitted in a form other than parallel light, and a distance between the semiconductor laser and the light-emitting section varies due to oscillation or some other reasons, the excitation area of the light-emitting section varies in response to the variation, and as a result, contrasting occurs in the illumination light. However, if the diffusing structure is present between the semiconductor laser and the light-emitting section as in the light-emitting device according to the present invention, the excited region of the light-emitting section is not sensitively affected by the variations in the distance between the semiconductor laser and the light-emitting section.

It is possible to further enhance the efficiency in extracting light by providing more satisfactory absorptance and other optical properties of the transparent member configuring the diffusing structure than those of a sealing body instead of scattering the laser light merely by the light-emitting section (phosphors+sealing material).

[Additional Statement]

In addition, the present invention is not limited to the aforementioned embodiments, various modifications can be made within a scope of the claims, and embodiments achieved by appropriately combining technical means disclosed in different embodiments are also included in the technical scope of the present invention.

[4. Different Expression of the Present Invention]

The present invention can also be expressed as follows.

That is, the diffusing structure of the transparent member in the light-emitting element according to the present invention may have a structure of isotropically scattering the fluorescent light generated by the light-emitting section and increasing the light-emission spot size of the laser light.

With such a configuration, the diffusing structure is a structure of isotropically scattering the fluorescent light generated from the light-emitting section and increasing the light-emission spot size of the laser light.

Accordingly, even if an extremely small part of the light-emitting section (light-emission spot) is extremely strongly excited and strongly emits light, the fluorescent light generated from the part is diffused (or scattered) while passing through the inside of the transparent member and is emitted as light with an enlarged light-emission spot size from the light-emitting section to the outside. Therefore, it is possible to obtain illumination light which is safe for eyes.

According to the light-emitting element of the present invention, a thickness of the transparent member along a laser light irradiation direction may be equal to or more than ½ of a thickness, with which the laser light passing through the inside of the transparent member and emitted to the outside becomes light of equal to or less than maximum permissible exposure.

With such a configuration, the laser light reflected by the light-emitting section, passing through the inside of the transparent member, and emitted to the outside becomes light of equal to or less than the maximum permissible exposure. Therefore, it is possible to obtain illumination light which is safer for eyes.

According to the light-emitting element of the present invention, a minimum diameter of a surface of the light-emitting section on the laser light irradiation side may be equal to or less than the thickness of the transparent member.

If the minimum diameter of the surface of the light-emitting section on the laser light irradiation side is equal to or less than the thickness of the transparent member, in other words, if the thickness of the transparent member is equal to or more than the minimum diameter of the surface of the light-emitting section on the laser light irradiation side, it is possible to implement eye safety regardless of a state of the fluorescent light emitted from the light-emitting section.

According to the light-emitting element of the present invention, the transparent member may contain any one kind out of scattering fine particles and air bubbles with a refractive index which is different from a refractive index of a base material thereof.

With such a configuration, it is possible to adjust a laser light scattering property of the transparent member by adjusting density and distribution of the scattering fine particles or the air bubbles in the transparent member.

According to the light-emitting element of the present invention, density of the scattering fine particles or the air bubbles may decrease on the laser light irradiation side of the transparent member.

With such a configuration, it is possible to suppress a situation that the laser light which is incident on the transparent member is reflected by the presence of the scattering fine particles or the air bubbles and the amount of the laser light which reaches the light-emitting section excessively decreases.

According to the light-emitting section of the present invention, density of the scattering fine particles or the air bubbles may decrease on a side of the transparent member, which is close to the light-emitting section.

With such a configuration, it is possible to suppress a situation that the fluorescent light generated by the light-emitting section is reflected by the presence of the scattering fine particles or the air bubbles on the side of the transparent member, which is closer to the light-emitting section.

According to the light-emitting element of the present invention, a reflection preventing structure for reducing a reflectance of the laser light may be provided on the side of a light irradiation surface of the transparent member, which is irradiated with the laser light.

With such a configuration, it is possible to reduce the reflectance of the laser light at the boundary between the air and the reflection preventing structure by providing the reflection preventing structure for reducing the reflectance of the laser light on the side of the light irradiation surface.

In doing so, the reflectance of the laser light at the boundary between the air and the transparent member is reduced, and therefore, efficiency in irradiating the light-emitting section with the laser light increases.

As examples of the reflection preventing structure, a structure obtained by laminating an optical thin film (reflection preventing film) or a concave and convex structure which will be described later can be exemplified.

According to the light-emitting element of the present invention, the reflection preventing structure may have a concave and convex structure, in which at least a plurality of concave portions or a plurality of convex portions are aligned at an interval capable of reducing reflection of the laser light on the light irradiation surface.

With such a configuration, a difference in refractive indexes of the air and the concave and convex structure is calmly varies and the reflectance of the excitation light at the boundary between the air and the transparent substrate is significantly reduced by forming the concave and convex structure, in which at least the plurality of convex portions or the plurality of concave portions are aligned at an interval capable of reducing reflection at the light irradiation surface of the excitation light with a certain wavelength, on the side of the light irradiation surface.

In doing so, the laser light is substantially not reflected at the boundary between the air and the transparent member with a large difference in the refractive indexes in general, and therefore, efficiency in irradiating the light-emitting section with the laser light is enhanced.

In addition, the reflectance of the fluorescent light at the boundary between the air and the transparent member is significantly reduced.

In doing so, the fluorescent light is reflected at the boundary between the air and the transparent member, and the fluorescent light does not remain in the transparent member or the light-emitting section. Therefore, efficiency in extracting the fluorescent light is enhanced.

Furthermore, the light irradiation surface and a surface opposite to the light irradiation surface are distant away from each other by a distance corresponding to the thickness of the transparent member. In other words, the refractive index boundary, on which the concave and convex structure is formed, on the laser light incident side (it is assumed that the boundary between the air and the transparent member will be referred to as the refractive index boundary) and the thermal boundary, through which the heat from the light-emitting section as a main heat generation source among the constituents of the light-emitting element is delivered to the transparent member, are separated from each other. In doing so, it is possible to prevent the concave and convex structure from being damaged due to the heat generated from the light-emitting section. Accordingly, it is possible to maintain the aforementioned functions of the light-emitting element according to the present invention over a long period.

Accordingly, it is possible to enhance light-emitting efficiency of the light-emitting section and maintain the high light-emitting efficiency over a long period.

Here, the "convex portion" means a projection extending in the laser light irradiation direction, or a part locally projecting in the laser light irradiation direction between concave portions. The "concave portion" means a hole with a depth in the laser light irradiation direction, or a part locally depressed in the laser light irradiation direction between the convex portions.

According to the light-emitting element of the present invention, a portion where a diameter of a cross section parallel to the light irradiation surface is constant may be present between a root side to a tip end side of each convex portion, a portion where the diameter of the cross section parallel to the light irradiation surface increases may be present in a direction from the root side to the tip end side of each convex portion, or a portion where the diameter of the cross section parallel to the light irradiation surface decreases in the direction from the root side to the tip end side of each convex portion may be present.

According to the light-emitting element of the present invention, concave portion depths in a direction orthogonal to the light irradiation surface and concave portion widths in a direction parallel to the light irradiation surface of the plurality of concave portions may be different from each other.

The light-emitting device according to the present invention is a light-emitting device including: any one of the light-emitting elements; and a laser light source which irradiates the transparent member with the laser light.

In doing so, it is possible to configure the light-emitting device capable of enhancing the light-emitting efficiency of the light-emitting section and maintaining the high light-emitting efficiency over a long period.

The light-emitting device of the present invention may include a thermal conductive substrate which diffuses heat generated by the light-emitting section, and a side opposite to an irradiation surface of the light-emitting section, which is irradiated with the laser light, may be held by the thermal conductive substrate.

In doing so, the effect of cooling the light-emitting section is enhanced by holding the light-emitting section by the thermal conductive substrate.

The light-emitting device according to the present invention may include a reflecting member which reflects the laser light, and the side opposite to the irradiation surface of the light-emitting section, which is irradiated with the laser light, may be held by the reflecting member.

In doing so, the laser light permeating through the inside of the light-emitting section is reflected by the reflecting member, and therefore, an optical path length of the laser light permeating through the inside of the light-emitting section is doubled. In doing so, it is possible to achieve sufficient light-emitting efficiency by fixing density of the phosphors and thickness of the light-emitting section in the laser light irradiation direction is reduced to ½.

The light-emitting device according to the present invention may include a reflecting mirror which includes a light reflecting concave surface that reflects the fluorescent light generated by the light-emitting section, and the light-emitting section may be arranged in the vicinity of a focal point of the reflecting mirror.

In doing so, it is possible to implement a transparent-type light-emitting device provided with the light-emitting device according to the present invention.

INDUSTRIAL APPLICABILITY

The present invention can be applied to a light-emitting element, a light-emitting device provided with the light-emitting element, and an illumination device. For example, the present invention can be applied to a headlamp for a car, headlamps for other vehicles and moving objects (a human, a vessel, an aircraft, a submersible vessel, and a rocket, for example), and other illumination devices. As other illumination devices, the present invention can also be applied to a search light, a projector, illumination equipment for domestic use, and downlight, for example.

REFERENCE SIGNS LIST

1: transparent material
2: light-emitting section
3: semiconductor laser (laser light source)
4: parabola-type reflecting mirror (reflecting mirror)
4h: half-parabola-type reflecting mirror (reflecting mirror)
4p: thermal conductive member (reflecting member)
10a to 10d: light-emitting element
20: reflective-type light-emitting device (light-emitting device)
30: transparent-type light-emitting device (light-emitting device)
101: base material
200: laser downlight (light-emitting device)
212: concave portion (reflecting mirror)
d: interval (interval capable of reducing reflection)
d1, d2: density
dep1 to dep4: concave portion depth
w1 to w4: concave portion width
g: reflection preventing structure (concave and convex structure)
h, h1 to h4: height (convex portion height)
H: thickness
L: laser light
LS1, LS2: light-emission spot
MP: scattering microregion (scattering fine particles, air bubbles)
n1, n2: refractive index
PJ: projection (convex portion)
PH: minute hole (concave portion)
S: light-emitting section size SUF1, SUF1': light irradiation surface
SUF2, SUF2': surface (surface on side irradiated with laser light)
SUF3: light reflecting concave surface

The invention claimed is:

1. A light-emitting element comprising:
a light-emitting section which is irradiated with laser light and generates fluorescent light the laser light being incident on an incident surface of the light-emitting section; and
a transparent member which covers the incident surface of the light-emitting section and exhibits transparency with respect to the laser light,
wherein the transparent member includes a diffusing structure of isotropically scattering the laser light which passes therethrough and increasing a light-emission spot size of the laser light,
the transparent member contains scattering fine particles with a refractive index which is different from a refractive index of a base material of the transparent member, or air bubbles,
the transparent member comprises an upper portion which includes the fine particle or the air bubbles and receives the laser light and a lower portion which includes the fine particle or the air bubbles and covers the incident surface, the lower portion being disposed between the upper portion and the light emitting section, and
a density of the scattering fine particles or the air bubbles in the upper portion of the transparent member is smaller than a density of scattering fine particles or the air bubbles in the lower portion of the transparent member.

2. The light-emitting element according to claim 1, wherein the diffusing structure of the transparent member is a structure of isotropically scattering the fluorescent light generated by the light-emitting section and increasing the light-emission spot size of the fluorescent light.

3. The light-emitting element according to claim 1, wherein a thickness of the transparent member along a laser light irradiation direction is equal to or more than ½ of a thickness with which laser light passing through the inside of the transparent member and emitted to the outside becomes light of equal to or less than maximum permissible exposure.

4. The light-emitting element according to claim 3, wherein a minimum diameter of a surface of the light-emitting section on the incident surface is equal to or less than the thickness of the transparent member.

5. The light-emitting element according to claim 1, wherein density of the scattering fine particles or the air bubbles decreases on a side of the transparent member, which is close to the light-emitting section.

6. The light-emitting element according to claim 1, wherein a reflection preventing structure for reducing a reflectance of the laser light is provided on the side of a light irradiation surface of the transparent member, which is irradiated with the laser light.

7. The light-emitting element according to claim 6, wherein the reflection preventing structure has a concave and convex structure in which at least a plurality of concave portions or a plurality of convex portions are aligned at an interval capable of reducing reflection of the laser light on the light irradiation surface.

8. The light-emitting element according to claim 7, wherein each convex portion has, between a root side to a tip end side thereof, a portion where a diameter of a cross section parallel to the light irradiation surface is constant.

9. The light-emitting element according to claim 7 wherein each convex portion has, in a direction from a root side to a tip end side thereof, a portion where a diameter of a cross section parallel to the light irradiation surface increases.

10. The light-emitting element according to claim 7, wherein the plurality of concave portions have concave portion depths different from each other in a direction orthogonal to the light irradiation surface and have concave portion widths different from each other in a direction parallel to the light irradiation surface.

11. The light-emitting element according to claim 7, wherein each convex portion has, in a direction from a root side to a tip end side, a portion where a diameter of a cross section parallel to the light irradiation surface decreases.

12. A light-emitting device comprising:
the light-emitting element according to claim 1; and
a laser light source which irradiates the transparent member with the laser light.

13. The light-emitting device according to claim 12, further comprising:
a thermal conductive substrate which diffuses heat generated by the light-emitting section,
wherein a side opposite to an irradiation surface of the light-emitting section, which is irradiated with the laser light, is held by the thermal conductive substrate.

14. The light-emitting device according to claim 12, further comprising a reflecting member which reflects the laser light,
wherein a side opposite to an irradiation surface of the light-emitting section, which is irradiated with the laser light, is held by the reflecting member.

15. The light-emitting device according to claim 12, further comprising a reflecting mirror which includes a light reflecting concave surface that reflects the fluorescent light generated by the light-emitting section,
wherein the light-emitting section is arranged in the vicinity of a focal point of the reflecting mirror.

16. A method for producing a light-emitting element including a light-emitting section which is irradiated with laser light and generates fluorescent light, the laser light being incident on an incident surface of the light-emitting section, and a transparent member which covers the incident surface of the light-emitting section and exhibits transparency with respect to the laser light, the transparent member including a diffusing structure of isotropically scattering the laser light which passes therethrough and increasing a light-emission spot size of the laser light, the method comprising:
a transparent member formation process of forming the transparent member containing a plurality of scattering fine particles or air bubbles for scattering the laser light, the transparent member comprising an upper portion which includes the fine particle or the air bubbles and receives the laser light and a lower portion which includes the fine particle or the air bubbles and covers the incident surface, and a density of the scattering fine particles or the air bubbles in the upper portion of the transparent member being smaller than a density of scattering fine particles or the air bubbles in the lower portion of the transparent member; and
a light-emitting section arrangement process of arranging the light-emitting section on the lower portion of the transparent member so that the lower portion is disposed between the upper portion and the light emitting section.

* * * * *